US012028929B2

(12) United States Patent
Zong et al.

(10) Patent No.: US 12,028,929 B2
(45) Date of Patent: Jul. 2, 2024

(54) METHOD AND APPARATUS FOR SELECTING SESSION MANAGEMENT NETWORK ELEMENT

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 17/491,849

(22) Filed: Oct. 1, 2021

(65) Prior Publication Data

US 2022/0022023 A1 Jan. 20, 2022

Related U.S. Application Data

(63) Continuation of application No. PCT/CN2020/083074, filed on Apr. 2, 2020.

(30) Foreign Application Priority Data

Apr. 2, 2019 (CN) ......................... 201910263105.9
Apr. 30, 2019 (CN) ......................... 201910364111.3

(51) Int. Cl.
*H04W 8/02* (2009.01)
*H04W 48/08* (2009.01)
*H04W 64/00* (2009.01)

(52) U.S. Cl.
CPC ............ *H04W 8/02* (2013.01); *H04W 48/08* (2013.01); *H04W 64/00* (2013.01)

(58) Field of Classification Search
CPC ....... H04W 8/02; H04W 48/08; H04W 64/00; H04W 88/182; H04L 67/14; H04L 67/147; H04L 67/2871; H04L 67/289; H04L 67/51; H04L 67/56; H04L 69/22
See application file for complete search history.

(56) References Cited

U.S. PATENT DOCUMENTS 9,531,677 B1 12/2016 Rodgers et al.
2017/0339609 A1 11/2017 Youn et al.
2018/0324646 A1 11/2018 Lee et al.
(Continued)

FOREIGN PATENT DOCUMENTS

CN 107409303 A 11/2017
CN 108684073 A 10/2018
(Continued)

OTHER PUBLICATIONS

Ericsson, et al., "eSBA communication schemas related to SMF discovery and selection", 3GPP TSG SA WG2 Meeting #131, S2-1902924, Feb. 24-Mar. 1, 2019. (Year: 2019).*
(Continued)

*Primary Examiner* — Chi H Pham
*Assistant Examiner* — Ji-Hae Yea
(74) *Attorney, Agent, or Firm* — Conley Rose, P.C.

(57) ABSTRACT

A method and an apparatus for selecting a session management network element, where a mobility management network element may obtain information about one or more first session management network elements, and support selecting a session management network element in a home routed mode or an enhanced topology mode.

30 Claims, 10 Drawing Sheets

200

Service communication proxy network element
Mobility management network element
S210: First message
S220: Obtain first parameter information based on the first message
S230: Determine whether there is an SMF that satisfies the first parameter information
S240: Reject message

(56) References Cited

U.S. PATENT DOCUMENTS

| | | | |
|---|---|---|---|
| 2018/0376384 | A1 | 12/2018 | Youn et al. |
| 2019/0090164 | A1 | 3/2019 | Ding et al. |
| 2019/0141583 | A1 | 5/2019 | Ying et al. |
| 2020/0137828 | A1 | 4/2020 | Yang et al. |
| 2020/0187061 | A1 | 6/2020 | Zhu et al. |

FOREIGN PATENT DOCUMENTS

| | | | |
|---|---|---|---|
| CN | 108811009 | A | 11/2018 |
| CN | 108966320 | A | 12/2018 |
| CN | 109121170 | A | 1/2019 |
| CN | 109155949 | A | 1/2019 |
| CN | 109328472 | A | 2/2019 |
| CN | 109429364 | A | 3/2019 |
| CN | 109548094 | A | 3/2019 |
| CN | 109548098 | A | 3/2019 |
| WO | 2018145671 | A1 | 8/2018 |

OTHER PUBLICATIONS

Ericsson, et al., “eSBA communication schemas related to SMF discovery and selection”, 3GPP TSG SA WG2 #130, S2-1902814, Jan. 21-25, 2019. (Year: 2019).*

NTT Docomo, et al., “ETSUN—Architecture conclusion”, 3GPP TSG SA WG2 #130, S2-1900858, Jan. 21-25, 2019. (Year: 2019).*

Ericsson, et al., “eSBA communication schemas related to SMF discovery and selection,” 3GPP TSG SA WG2 #131, S2-1902814, Jan. 21-25, 5 pages.

NTT Docomo, et al., “ETSUN—Architecture conclusion,” 3GPP TSG SA WG2 #130, S2-1900858, Jan. 25, 2019, 16 pages.

Ericsson et al., “eSBA communication schemas related to SMF discovery and selection”, 3GPP TSG-SA WG2 Meeting #130 S2-1901263, Jan. 21-25, Kochi, India, 3 pages.

R. Fielding, Ed. et al., “Hypertext Transfer Protocol (HTTP/1.1): Message Syntax and Routing,” RFC 7230, Jun. 2014, 89 pages.

Ericsson et al., “eSBA communication schemas related to SMF discovery and selection,” 3GPP TSG-SA WG2 Meeting #130 S2-1901591, Jan. 21-25, 2019, Kochi, India, 3 pages.

3GPP TS 29.500 V15.3.0 “3rd Generation Partnership Project; Technical Specification Group Core Network and Terminals; 5G System; Technical Realization of Service Based Architecture; Stage 3 (Release 15),” Mar. 2019, 33 pages.

Huawei et al., “eSBA: SMF selection,” 3GPP TSG-SA2 Meeting #132, S2-1903557, Xi’an, China, Apr. 8-12, 2019, 4 pages.

3GPP TS 23.501 V16.0.2 “3rd Generation Partnership Project; Technical Specification Group Services and System Aspects; System Architecture for the 5G System; Stage 2 (Release 16),” Apr. 2019, 317 pages.

Huawei et al., “eSBA SMF selection”, SA WG2 Meeting #132 S2-1903558, Xi’an, China, Apr. 8-12, 2019, 6 pages.

3GPP TS 29.510 V15.3.0 “3rd Generation Partnership Project; Technical Specification Group Core Network and Terminals; 5G System; Network Function Repository Services; Stage 3 (Release 15),” Mar. 2019, 121 pages.

3GPP TS 29.502 V15.3.0 “3rd Generation Partnership Project; Technical Specification Group Core Network and Terminals; 5G System; Session Management Services; Stage 3 (Release 15),” Mar. 2019, 147 pages.

3GPP TS 29.573 V15.1.0 “3rd Generation Partnership Project; Technical Specification Group Core Network and Terminals; 5G System; Public Land Mobile Network (PLMN) Interconnection; Stage 3 (Release 15),” Dec. 2018, 57 pages.

* cited by examiner

METHOD AND APPARATUS FOR SELECTING SESSION MANAGEMENT NETWORK ELEMENT

CROSS-REFERENCE TO RELATED APPLICATIONS

This application is a continuation of International Patent Application No. PCT/CN2020/083074, filed on Apr. 2, 2020, which claims priority to Chinese Patent Application No. 201910263105.9, filed on Apr. 2, 2019, and Chinese Patent Application No. 201910364111.3, filed on Apr. 30, 2019. All of the aforementioned patent applications are hereby incorporated by reference in their entireties.

TECHNICAL FIELD

This application relates to the communications field, and more specifically, to a method and an apparatus for selecting a session management network element.

BACKGROUND

A delegated discovery mode is introduced to a service-based architecture in 3$^{rd}$ Generation Partnership Project (3GPP) Release 16. To be specific, a network element (or network function) does not perform a discovery function, but a service communication proxy (SCP) performs a service discovery function instead. However, in the following scenarios in which two session management functions (SMFs) need to be selected, for example, in a home routed mode or an enhanced topology of an SMF and a user plane function (UPF) in 5$^{th}$ generation (5G) networks (ETSUNs) mode, the delegated discovery mode is no longer applicable.

Specifically, for example, if a session uses the home routed mode, an access and mobility management function (AMF) needs to select a visited public land mobile network (VPLMN) SMF (V-SMF) and a home PLMN (HPLMN) SMF (H-SMF). In the home routed mode, the AMF sends, to the V-SMF, a request message that includes information about the selected H-SMF, such that the V-SMF can send a request message to the H-SMF based on the H-SMF selected by the AMF. However, when the AMF works in the delegated discovery mode, because the AMF does not select an SMF, the AMF cannot fill the information about the H-SMF in the request message. Therefore, how to select the H-SMF and how to send the information about the H-SMF to the V-SMF are problems that need to be resolved.

SUMMARY

In view of this, this application provides a method and an apparatus for selecting a session management network element. A service communication proxy network element sends one or more first SMFs to a mobility management network element, to support selecting an SMF in a home routed mode or an enhanced topology mode.

According to a first aspect, a method for selecting a session management network element is provided. The method includes: A service communication proxy network element receives a first message from a mobility management network element; the service communication proxy network element obtains first parameter information based on the first message, where the first message is used to request the service communication proxy network element to select an SMF based on the first parameter information, and the first parameter information includes user equipment (UE) location information and a data network name (DNN); the service communication proxy network element determines whether there is an SMF that satisfies the first parameter information; and when there is no SMF that satisfies the first parameter information, the service communication proxy network element selects one or more first SMFs that support the DNN, and sends a reject message to the mobility management network element, where the reject message includes information about the one or more first SMFs. In this way, the service communication proxy network element sends the information about the one or more first SMFs that support the DNN to the mobility management network element, such that the mobility management network element may obtain the information about the one or more first SMFs, to perform a subsequent operation.

In a possible implementation, the method further includes: When there is an SMF that satisfies the first parameter information, the service communication proxy network element obtains a first request message based on the first message, and sends the first request message to the SMF.

Optionally, the information about the one or more first SMFs includes one or more of the following: service area information of a server of the one or more first SMFs, identification information of the one or more first SMFs, or a uniform resource identifier (URI) or URIs of the one or more first SMFs.

In a possible implementation, the method further includes: The service communication proxy network element receives a second message from the mobility management network element; the service communication proxy network element obtains second parameter information based on the second message, where the second parameter information includes the UE location information; the service communication proxy network element selects a second SMF based on the second parameter information; the service communication proxy network element obtains a second request message based on the second message; and the service communication proxy network element sends the second request message to the second SMF. In this way, the service communication proxy network element may receive the second message from the mobility management network element, and obtain the second parameter information, to select the second SMF that satisfies the second parameter information.

In a possible implementation, the method further includes: The service communication proxy network element sends information about the second SMF to the mobility management network element. In this way, the service communication proxy network element may send the information about the selected second SMF to the mobility management network element.

Optionally, the service communication proxy network element may receive a response message from the second SMF, and then send the response message to the mobility management network element, where a header or a message body of the response message carries the information about the second SMF.

Optionally, the information about the second SMF includes one or more of the following: service area information of a server, identification information, or a URI that are of the second SMF.

In a possible implementation, that when there is no SMF that satisfies the first parameter information, the service communication proxy network element selects one or more first SMFs that support the DNN, and sends a reject message to the mobility management network element includes: The first parameter information further includes target network element type indication information; and if the target network element type indication information is used to indicate the service communication proxy network element to select an SMF, when the service communication proxy network element determines that there is no SMF that satisfies the first parameter information, the service communication proxy network element selects the one or more first SMFs that support the DNN, and sends the information about the one or more first SMFs to the mobility management network element. In other words, the service communication proxy network element may select, based on the target network element type indication information, the one or more first SMFs that support the DNN, and send the reject message to the mobility management network element.

In a possible implementation, the method further includes: The service communication proxy network element receives first indication information from the mobility management network element, where the first indication information is used to indicate the service communication proxy network element to select, when the service communication proxy network element determines that there is no SMF that satisfies the first parameter information, the one or more first SMFs that support the DNN, and send the information about the one or more first SMFs to the mobility management network element. In other words, the service communication proxy network element may select, based on the first indication information, the one or more first SMFs that support the DNN, and send the reject message to the mobility management network element. Optionally, the first indication information is used to indicate the service communication proxy network element to select an H-SMF, and the H-SMF is an SMF that supports the DNN.

Optionally, the second request message includes the information about the one or more first SMFs.

Optionally, the second SMF is a visited session management function (V-SMF), and the first SMF is an H-SMF. The first parameter information further includes a home public land mobile network identity (HPLMN ID). The first parameter information is used to discover a home session management function H-SMF. The reject message includes information about one or more H-SMFs.

Optionally, that when there is no SMF that satisfies the first parameter information, the service communication proxy network element selects one or more first SMFs that support the DNN includes: when there is no SMF that satisfies the first parameter information, the service communication proxy network element selects one or more H-SMFs that support the HPLMN ID and the DNN. In this way, if there is no SMF that satisfies the UE location information, the HPLMN ID, and the DNN, the service communication proxy network element may select the one or more H-SMFs that support the HPLMN ID and the DNN.

Optionally, the second SMF is an intermediate session management function (I-SMF).

According to a second aspect, a method for selecting a session management network element is provided. The method includes: A mobility management network element sends a first message to a service communication proxy network element, where the first message includes first parameter information, and where the first message is used to request the service communication proxy network element to select an SMF based on the first parameter information, obtains a first request message based on the first request message, and sends the first request message to the SMF, where the first parameter information includes UE location information and a DNN. Further, the mobility management network element receives a reject message from the service communication proxy network element, where the reject message includes information about one or more first SMFs that support the DNN and that are selected by the service communication proxy. In this way, the mobility management network element may obtain the information about the one or more first SMFs, to perform a subsequent operation.

Optionally, the information about the one or more first SMFs includes one or more of the following: service area information of a server of the one or more first SMFs, identification information of the one or more first SMFs, or a URI or URIs of the one or more first SMFs.

In a possible implementation, the method further includes: The mobility management network element sends a second message to the service communication proxy network element, where the second message includes second parameter information and information about one or more third SMFs in the one or more first SMFs, where the second parameter information is used to discover a second SMF, where the second parameter information includes the UE location information, and where information about the one or more third SMFs is sent to the second SMF. In this way, the mobility management network element may send the second message to the service communication proxy network element, such that the service communication proxy network element obtains the second parameter information.

In a possible implementation, the method further includes: The mobility management network element receives information about the second SMF from the service communication proxy network element. In this way, the mobility management network element may obtain the information about the second SMF.

Optionally, the mobility management network element receives a response message from the service communication proxy network element, where a header or a message body of the response message carries the information about the second SMF.

Optionally, the information about the second SMF includes one or more of the following: service area information of a server, identification information, or a URI that are of the second SMF.

In a possible implementation, the first parameter information further includes target network element type indication information, and the target network element type indication information is used to indicate the service communication proxy network element to select an SMF.

In a possible implementation, the method further includes: the mobility management network element sends first indication information to the service communication proxy network element, where the first indication information is used to indicate the service communication proxy network element to select, when the service communication proxy network element determines that there is no SMF that satisfies the first parameter information, one or more first SMFs that support the DNN, and send information about the one or more first SMFs to the mobility management network element.

Optionally, the second SMF is a visited session management function (V-SMF), and the one or more first SMFs are one or more H-SMFs. The first parameter information further includes a home public land mobile network identity (HPLMN ID). The first parameter information is used to discover a home session management function (H-SMF). The reject message includes information about the one or more H-SMFs.

Optionally, the information about the one or more H-SMFs indicates one or more H-SMFs that support the HPLMN ID and the DNN and that are selected by the service communication proxy network element.

Optionally, the second SMF is an intermediate session management function (I-SMF).

According to a third aspect, a method for selecting a session management network element is provided. The method includes: A service communication proxy network element receives a first message from a mobility management network element; the service communication proxy network element obtains first parameter information based on the first message, where the first message is used to request the service communication proxy network element to select an SMF based on the first parameter information, obtains a first request message based on the first message, and sends the first request message to the SMF, where the first parameter information includes UE location information and a DNN; the service communication proxy network element determines whether there is an SMF that satisfies the first parameter information; and when there is no SMF that satisfies the first parameter information, the service communication proxy network element sends a reject message to the mobility management network element, where the reject message is used to indicate that there is no SMF that satisfies the first parameter information. In this way, the service communication proxy network element sends the reject message to the mobility management network element, such that the mobility management network element can learn that there is no SMF that satisfies the first parameter information, to perform a subsequent operation.

In a possible implementation, the method further includes: When there is an SMF that satisfies the first parameter information, the service communication proxy network element obtains a first request message based on the first message, and sends the first request message to the SMF.

In a possible implementation, the method further includes: the service communication proxy network element receives second parameter information from the mobility management network element, where the second parameter information includes the DNN; the service communication proxy network element selects one or more first SMFs that support the second parameter information, and sends a first response message to the mobility management network element, where the first response message includes information about the one or more first SMFs. The service communication proxy network element sends the information about the one or more first SMFs that support the DNN to the mobility management network element, such that the mobility management network element may obtain the information about the first SMF, to perform a subsequent operation. In this way, the mobility management network element may send the information about the first SMF to a second SMF. For example, in an enhanced topology mode, the mobility management network element may send information about an I-SMF to an SMF.

Optionally, the information about the one or more first SMFs includes at least one of the following: service area information of a server of the one or more first SMFs, identification information of the one or more first SMFs, or a URI or URIs of the one or more first SMFs.

In a possible implementation, the method further includes: the service communication proxy network element receives a second message from the mobility management network element; the service communication proxy network element obtains third parameter information based on the second message, where the third parameter information includes the UE location information; the service communication proxy network element selects the second SMF based on the third parameter information; and the service communication proxy network element obtains a second request message based on the second message, and sends the second request message to the second SMF.

In a possible implementation, the method further includes: the service communication proxy network element sends information about the second SMF to the mobility management network element.

In a possible implementation, that the service communication proxy network element selects one or more first SMFs that support the second parameter information, and sends a first response message to the mobility management network element includes: the second parameter information further includes first indication information, and the first indication information is used to indicate the service communication proxy network element to select the one or more SMFs that support the DNN, and send the first response message to the mobility management network element.

Optionally, the service communication proxy network element may receive a response message from the second SMF, and then send the response message to the mobility management network element, where a header or a message body of the response message carries the information about the second SMF.

Optionally, the information about the second SMF includes one or more of the following: service area information of a server, identification information, or a URI that are of the second SMF.

In a possible implementation, that the service communication proxy network element selects one or more first SMFs that support the second parameter information, and sends a first response message to the mobility management network element includes: the second parameter information further includes first target network element type indication information. If the first target network element type indication information is used to indicate an SMF, the service communication proxy network element selects the one or more first SMFs that support the DNN, and sends the first response message to the mobility management network element.

In a possible implementation, that the service communication proxy network element selects one or more first SMFs that support the second parameter information, and sends a first response message to the mobility management network element includes: the second parameter information further includes first indication information, and the first indication information is used to indicate the service communication proxy network element to select the one or more first SMFs that support the DNN, and send the first response message to the mobility management network element.

In a possible implementation, that the service communication proxy network element selects the second SMF based on the third parameter information includes: the third parameter information further includes second target network element type indication information, and the second target network element type indication information is used to indicate an intermediate SMF.

Optionally, the second SMF is an intermediate session management function (I-SMF).

According to a fourth aspect, a method for selecting a session management network element is provided. The method includes: A mobility management network element sends a first message to a service communication proxy network element, where the first message includes first parameter information, and where the first message is used to request the service communication proxy network element to select an SMF based on the first parameter information, obtains a first request message based on the first request message, and sends the first request message to the SMF, where the first parameter information includes UE location information and a DNN. Further, the mobility management network element receives a reject message from the service communication proxy network element, where the reject message is used to indicate that there is no SMF that support the first parameter information. In this way, the mobility management network element can learn that there is no SMF that satisfies the first parameter information, to perform a subsequent operation.

In a possible implementation, the method further includes: The mobility management network element sends second parameter information to the service communication proxy network element, where the second parameter information includes the DNN; and the mobility management network element receives a first response message from the service communication proxy network element, where the first response message includes information about one or more first SMFs.

In a possible implementation, the method further includes: The mobility management network element sends a second message to the service communication proxy network element, where the second message includes third parameter information, where the third parameter information includes the UE location information, and where the third parameter information is used to select a second SMF.

In a possible implementation, the method further includes: The mobility management network element receives information about the second SMF from the service communication proxy network element.

Optionally, the mobility management network element may receive a response message from the service communication proxy network element, where the response message is sent by the second SMF to the service communication proxy network element, and where a header or a message body of the response message carries the information about the second SMF.

Optionally, the information about the second SMF includes one or more of the following: service area information of a server, identification information, or a URI that are of the second SMF.

Optionally, the second parameter information further includes first indication information, and the first indication information is used to indicate the service communication proxy network element to select one or more SMFs that support the DNN, and send the first response message to the mobility management network element.

Optionally, the second parameter information further includes first target network element type indication information, and the first target network element type indication information is used to indicate the service communication proxy network element to select an SMF.

Optionally, the second parameter information further includes second target network element type indication information, and the second target network element type indication information is used to indicate the service communication proxy network element to select an intermediate SMF.

Optionally, the second SMF is an intermediate session management function (I-SMF).

According to a fifth aspect, a method for selecting a session management network element is provided. The method includes: A service communication proxy network element receives a first message from a mobility management network element; the service communication proxy network element obtains first parameter information based on the first message, where the first message is used to request the service communication proxy network element to discover an H-SMF based on the first parameter information, and where the first parameter information includes a home public land mobile network identity (HPLMN ID) and a data network name (DNN); and the service communication proxy network element selects one or more H-SMFs that satisfy the first parameter information, and sends a first response message to the mobility management network element, where the first response message includes information about the one or more H-SMFs. In this way, in a home routed mode, the service communication proxy network element sends, to the mobility management network element, one or more H-SMFs that support the HPLMN ID and the DNN, such that the mobility management network element may obtain information about the H-SMF, to perform a subsequent operation. For example, the mobility management network element may send the received information about the H-SMF to a V-SMF.

In a possible implementation, the method further includes: the service communication proxy network element receives a second message from the mobility management network element; the service communication proxy network element obtains second parameter information based on the second message, where the second parameter information includes UE location information; the service communication proxy network element selects a V-SMF based on the second parameter information; and the service communication proxy network element obtains the second request message based on the second message, and sends the second request message to the V-SMF.

In a possible implementation, the method further includes: the service communication proxy network element sends information about the V-SMF to the mobility management network element.

Optionally, the service communication proxy network element may receive a response message from the V-SMF, and then send the response message to the mobility management network element, where a header or a message body of the response message carries the information about the V-SMF.

Optionally, the information about the V-SMF includes one or more of the following: service area information of a server, identification information, or a URI that are of the V-SMF.

In a possible implementation, the method further includes: the service communication proxy network element receives first indication information from the mobility management network element, where the first parameter information further includes the first indication information, and where the first indication information is used to indicate the service communication proxy network element to return, after the service communication proxy network element discovers an H-SMF, a response message to the mobility management network element.

Optionally, that the service communication proxy network element selects one or more H-SMFs that satisfy the first parameter information, and sends a first response message to the mobility management network element includes: the first parameter information further includes first target network element type indication information, and if the first target network element type indication information is used to indicate an H-SMF or an SMF, the service communication proxy network element selects the one or more H-SMFs that support the HPLMN ID and the DNN, and sends the first response message to the mobility management network element.

Optionally, that the service communication proxy network element selects, based on the second parameter information, a V-SMF that supports the UE location information includes: the second parameter information further includes second target network element type indication information, and the second target network element type indication information is used to indicate the service communication proxy network element to select the V-SMF.

According to a sixth aspect, a method for selecting a session management network element is provided. The method includes: A mobility management network element sends a first message to a service communication proxy network element, where the first message includes first parameter information, the first message is used to request the service communication proxy network element to discover an H-SMF based on the first parameter information, and the first parameter information includes a home public land mobile network identity (HPLMN ID) and a data network name (DNN); and the mobility management network element receives a first response message from the service communication proxy network element, where the first response message includes information about one or more H-SMFs. In this way, in a home routed mode, the mobility management network element may obtain the information about the H-SMF, to perform a subsequent operation. For example, the mobility management network element may send the received information about the H-SMF to a V-SMF.

In a possible implementation, the method further includes: the mobility management network element sends a second message to the service communication proxy network element, where the second message includes second parameter information, where the second parameter information is used to discover a V-SMF, and where the second parameter information includes UE location information.

In a possible implementation, the method further includes: the mobility management network element receives information about the V-SMF from the service communication proxy network element.

Optionally, the mobility management network element may receive a response message from the service communication proxy network element, where the response message is sent by the V-SMF to the service communication proxy network element, and where a header or a message body of the response message carries the information about the V-SMF.

Optionally, the information about the V-SMF includes one or more of the following: service area information of a server, identification information, or a URI that are of the V-SMF.

In a possible implementation, the method further includes: the first parameter information further includes first indication information, and the first indication information is used to indicate the service communication proxy network element to return, after the service communication proxy network element discovers the H-SMF, a response message to the mobility management network element.

Optionally, the first parameter information further includes first target network element type indication information, and the first target network element type indication information is used to indicate the service communication proxy network element to select the H-SMF or the SMF.

Optionally, the second parameter information further includes second target network element type indication information, and the second target network element type indication information is used to indicate the service communication proxy network element to select the V-SMF.

According to a seventh aspect, a method for selecting a session management network element is provided. The method includes: A service communication proxy network element receives a first message from a mobility management network element; the service communication proxy network element obtains first parameter information based on the first message, where the first parameter information includes UE location information and a DNN; the service communication proxy network element determines whether there is an SMF that satisfies the first parameter information; and when there is no SMF that satisfies the first parameter information, the service communication proxy network element selects one or more first SMFs based on the DNN, and selects a second SMF based on the UE location information. The service communication proxy network element may determine whether two SMFs need to be selected for a session. In this way, when working in a delegated discovery mode, the mobility management network element still supports establishment of a session including two SMFs, such that an application scenario in which the mobility management network element works in the delegated discovery mode is not limited.

In a possible implementation, the method further includes: the service communication proxy network element generates a second request message based on the first message and information about the one or more first SMFs, where the second request message includes information about one or more fourth SMFs in the one or more first SMFs; and the service communication proxy network element sends the second request message to the second SMF.

In a possible implementation, the method further includes: the service communication proxy network element sends information about a fifth SMF and information about the second SMF to the mobility management network element, where the fifth SMF is an SMF selected by the second SMF from the one or more fourth SMFs.

Optionally, the information about the second SMF includes at least one of the following: service area information of a server, identification information, or a URI that are of the second SMF. The information about the fifth SMF includes one or more of the following: service area information of a server, identification information, or a URI that are of the fifth SMF.

Optionally, the information about the fifth SMF and the information about the second SMF are included in a header or a message body of the first response message.

In a possible implementation, the method further includes: the service communication proxy network element receives the first response message from the second SMF, where the first response message includes URI information of the fifth SMF. Additionally, that the service communication proxy network element sends information about the fifth SMF to the mobility management network element further includes: the service communication proxy network element obtains the information about the fifth SMF based on the URI information of the fifth SMF in the first response message; and the service communication proxy network element sends the information about the fifth SMF to the mobility management network element.

Optionally, that the service communication proxy network element generates a second request message based on the first message and information about the one or more first SMFs, where that the second request message includes information about one or more fourth SMFs in the one or more first SMFs further includes: the information about the one or more fourth SMFs is included in a header or a message body of the second request message.

Optionally, the first SMF is an SMF, and the second SMF is an I-SMF. Alternatively, the first SMF is an H-SMF, and the second SMF is a V-SMF.

According to an eighth aspect, a method for selecting a session management network element is provided. The method includes: A mobility management network element sends a first message to a service communication proxy network element, where the first message includes first parameter information, and the first parameter information includes UE location information and a DNN; and the mobility management network element receives information about a fifth SMF and information about a second SMF from the service communication proxy network element. The mobility management network element may obtain the two SMFs determined by the service communication proxy network element. In this way, when working in a delegated discovery mode, the mobility management network element still supports establishment of a session including two SMFs, such that an application scenario in which the mobility management network element works in the delegated discovery mode is not limited.

In a possible implementation, that the mobility management network element receives information about a fifth SMF and information about a second SMF from the service communication proxy network element includes: the mobility management network element receives a first response message from the service communication proxy network element, where the information about the fifth SMF and the information about the second SMF are included in a header or a message body of the first response message.

Optionally, the first SMF is an SMF, and the second SMF is an I-SMF. Alternatively, the first SMF is an H-SMF, and the second SMF is a V-SMF.

According to a ninth aspect, a method for selecting a session management network element is provided. The method includes: A service communication proxy network element receives a first message from a mobility management network element; the service communication proxy network element obtains first parameter information based on the first message, where the first message is used to request the service communication proxy network element to discover an SMF based on the first parameter information, and the first parameter information includes a DNN; and the service communication proxy network element selects one or more SMFs that satisfy the first parameter information, and sends a first response message to the mobility management network element, where the first response message includes information about the one or more SMFs. In this way, the service communication proxy network element sends the one or more SMFs that support the DNN to the mobility management network element, such that the mobility management network element may obtain the information about the SMF, to perform a subsequent operation. For example, the mobility management network element may determine, based on the received information about the SMF, whether an I-SMF needs to be selected.

In a possible implementation, the method further includes: the service communication proxy network element receives a second message from the mobility management network element; the service communication proxy network element obtains second parameter information based on the second message, where the second parameter information includes UE location information; the service communication proxy network element selects the I-SMF based on the second parameter information; and the service communication proxy network element obtains the second request message based on the second message, and sends the second request message to the I-SMF.

In a possible implementation, the method further includes: the service communication proxy network element sends information about the I-SMF to the mobility management network element.

Optionally, the service communication proxy network element may receive a response message from the I-SMF, and then send the response message to the mobility management network element, where a header or a message body of the response message carries the information about the I-SMF.

Optionally, the information about the I-SMF includes one or more of the following: service area information of a server, identification information, or a URI that are of the I-SMF.

In a possible implementation, the method further includes: the service communication proxy network element receives first indication information from the mobility management network element, where the first parameter information further includes the first indication information, and where the first indication information is used to indicate the service communication proxy network element to return, after the service communication proxy network element discovers an SMF, a response message to the mobility management network element.

Optionally, that the service communication proxy network element selects one or more SMFs that satisfy the first parameter information, and sends a first response message to the mobility management network element includes: the first parameter information further includes first target network element type indication information, and if the first target network element type indication information is used to indicate an H-SMF or an SMF, the service communication proxy network element selects one or more H-SMFs or one or more SMFs that support the DNN, and sends the first response message to the mobility management network element.

Optionally, that the service communication proxy network element selects, based on the second parameter information, an I-SMF that supports the UE location information includes: the second parameter information further includes second target network element type indication information, and if the second target network element type indication information is used to indicate the service communication proxy network element to select an I-SMF or a V-SMF, the service communication proxy network element selects an I-SMF or a V-SMF that supports the UE location information.

According to a tenth aspect, a method for selecting a session management network element is provided. The method includes: A mobility management network element sends a first message to a service communication proxy network element, where the first message includes first parameter information, the first message is used to request the service communication proxy network element to discover an SMF based on the first parameter information, and the first parameter information includes a DNN; and the mobility management network element receives a first response message from the service communication proxy network element, where the first response message includes information about one or more SMFs. In this way, the mobility management network element may obtain the information about the SMF, to perform a subsequent operation. For example, the mobility management network element may determine, based on the information about the SMF, whether an I-SMF needs to be selected.

In a possible implementation, the method further includes: the mobility management network element sends a second message to the service communication proxy network element, where the second message includes second parameter information, where the second parameter information is used to discover the I-SMF, and where the second parameter information includes UE location information.

In a possible implementation, the method further includes: before the mobility management network element sends the second message to the service communication proxy network element, the mobility management network element determines, based on the information about the SMF, whether there is an SMF that supports the UE location information, and if there is no SMF that supports the UE location information, the mobility management network element determines that the I-SMF needs to be selected.

In a possible implementation, the method further includes: the mobility management network element receives information about the I-SMF from the service communication proxy network element.

Optionally, the mobility management network element may receive a response message from the service communication proxy network element, where the response message is sent by the I-SMF to the service communication proxy network element, and where a header or a message body of the response message carries the information about the I-SMF.

Optionally, the information about the I-SMF includes one or more of the following: service area information of a server, identification information, or a URI that are of the I-SMF.

In a possible implementation, the method further includes: the first parameter information further includes first indication information, and the first indication information is used to indicate the service communication proxy network element to return, after the service communication proxy network element discovers an H-SMF or an SMF, a response message to the mobility management network element.

Optionally, the first parameter information further includes first target network element type indication information, and the first target network element type indication information is used to indicate an H-SMF or an SMF, and is used to indicate the service communication proxy network element to return, after the service communication proxy network element discovers the H-SMF or the SMF, a response message to the mobility management network element.

Optionally, the second parameter information further includes second target network element type indication information, and the second target network element type indication information is used to indicate the service communication proxy network element to select a V-SMF.

According to an eleventh aspect, a method for selecting a session management network element is provided. The method includes: A service communication proxy network element receives a first message from a mobility management network element; the service communication proxy network element obtains first parameter information and second parameter information based on the first message, where the first parameter information is used to select a first SMF, and the second parameter information is used to select a second SMF; and the service communication proxy network element selects one or more first SMFs based on the first parameter information, and selects a second SMF based on the second parameter information. In this way, the service communication proxy network element may determine, based on the first parameter information and the second parameter information, that both the first SMF and the second SMF need to be selected. This simplifies logic of the service communication proxy, such that the service communication proxy does not need to understand service-related logic.

In a possible implementation, the method further includes: the service communication proxy network element generates a second request message based on the first message and information about the one or more first SMFs, where the second request message includes information about one or more fourth SMFs in the one or more first SMFs; and the service communication proxy network element sends the second request message to the second SMF.

In a possible implementation, the method further includes: the first message includes indication information, and the indication information is used to indicate the service communication proxy to add information about the first SMF to the second request message. Alternatively, the indication information is used to indicate the service communication proxy network element to send the second request message to the second SMF.

In a possible implementation, the method further includes: if the indication information is included in the first parameter information, the indication information is first network element type indication information, and the first network element type indication information is used to indicate the service communication proxy network element to select an H-SMF or an SMF, the service communication proxy network element determines that the second request message includes the information about the first SMF. Alternatively, if the indication information is included in the second parameter information, the indication information is a second network element type indication information, and the second network element type indication information is used to indicate the service communication proxy network element to select a V-SMF or an I-SMF, the service communication proxy network element determines to send the second request message to the second SMF.

In a possible implementation, the method further includes: the service communication proxy network element sends information about a fifth SMF and information about the second SMF to the mobility management network element, where the fifth SMF is an SMF selected by the second SMF from the one or more fourth SMFs.

Optionally, the information about the second SMF includes at least one of the following: service area information of a server, identification information, or a URI that are of the second SMF. The information about the fifth SMF includes one or more of the following: service area information of a server, identification information, or a URI that are of the fifth SMF.

Optionally, the information about the fifth SMF and the information about the second SMF are included in a header or a message body of a first response message.

In a possible implementation, the method further includes: the service communication proxy network element receives the first response message from the second SMF, where the first response message includes URI information of the fifth SMF. Additionally, that the service communication proxy network element sends information about the fifth SMF to the mobility management network element further includes: the service communication proxy network element obtains the information about the fifth SMF based on the URI information of the fifth SMF in the first response message; and the service communication proxy network element sends the information about the fifth SMF to the mobility management network element.

Optionally, that the service communication proxy network element generates a second request message based on the first message and information about the one or more first SMFs, where the second request message includes information about one or more fourth SMFs in the one or more first SMFs further includes: the information about the one or more fourth SMFs is included in a header or a message body of the second request message.

Optionally, the first SMF is an SMF, and the second SMF is an I-SMF. Alternatively, the first SMF is an H-SMF, and the second SMF is a V-SMF.

According to a twelfth aspect, a method for selecting a session management network element is provided. The method includes: A mobility management network element sends a first message to a service communication proxy network element, where the first message includes first parameter information and second parameter information, where the first parameter information is used to select a first SMF, and where the second parameter information is used to select a second SMF; and the mobility management network element receives information about a fifth SMF and information about the second SMF from the service communication proxy network element. The mobility management network element may obtain the two SMFs determined by the service communication proxy network element. In this way, when working in a delegated discovery mode, the mobility management network element still supports establishment of a session including two SMFs, such that an application scenario in which the mobility management network element works in the delegated discovery mode is not limited.

Optionally, before requesting the service communication proxy network element to select the first SMF and the second SMF, the mobility management network element determines whether the second SMF needs to be selected.

In an implementation, before the mobility management network element sends the first message to the service communication proxy network element, the mobility management network element requests the service communication proxy network element to select an SMF that supports both UE location information and a DNN. If there is no SMF that supports both the UE location information and the DNN, the mobility management network element determines that the first SMF and the second SMF need to be selected.

In a possible implementation, that the mobility management network element receives information about a fifth SMF and information about the second SMF from the service communication proxy network element includes: the mobility management network element receives a first response message from the service communication proxy network element, where the information about the fifth SMF and the information about the second SMF are included in a header or a message body of the first response message.

Optionally, the first SMF is an SMF, and the second SMF is an I-SMF. Alternatively, the first SMF is an H-SMF, and the second SMF is a V-SMF.

According to a thirteenth aspect, a communications apparatus is provided. The communications apparatus is a service communication proxy network element (for example, an SCP entity), or may be a chip or a circuit. The communications apparatus is configured to perform the method performed by the service communication proxy network element in the method in any one of the foregoing aspects or any possible implementation of any one of the foregoing aspects. For example, the communications apparatus may be implemented by hardware, or may be implemented by hardware executing corresponding software.

In some possible implementations, the communications apparatus includes a module configured to perform the method performed by the service communication proxy network element in any one of the foregoing aspects or any possible implementation of any one of the foregoing aspects.

In some possible implementations, the communications apparatus includes a processor and a memory. The memory is configured to store an instruction. When the communications apparatus runs, the processor executes the instruction stored in the memory, such that the communications apparatus performs the method performed by the service communication proxy network element in any one of the foregoing aspects or any possible implementation of any one of the foregoing aspects. It should be noted that the memory may be integrated into the processor, or may be independent of the processor.

In some possible implementations, the communications apparatus includes a processor. The processor is configured to: be coupled to a memory, read an instruction from a memory, and perform, according to the instruction, the method performed by the service communication proxy network element in any one of the foregoing aspects or any possible implementation of any one of the foregoing aspects.

According to a fourteenth aspect, a communications apparatus is provided. The communications apparatus is a mobility management network element (for example, an AMF entity), or may be a chip or a circuit. The communications apparatus is configured to perform the method performed by the mobility management network element in the method in any one of the foregoing aspects or any possible implementation of any one of the foregoing aspects. For example, the communications apparatus may be implemented by hardware, or may be implemented by hardware executing corresponding software.

In some possible implementations, the communications apparatus includes a module configured to perform the method performed by the mobility management network element in any one of the foregoing aspects or any possible implementation of any one of the foregoing aspects.

In some possible implementations, the communications apparatus includes a processor and a memory. The memory is configured to store an instruction. When the communications apparatus runs, the processor executes the instruction stored in the memory, such that the communications apparatus performs the method performed by the mobility management network element in any one of the foregoing aspects or any possible implementation of any one of the foregoing aspects. It should be noted that the memory may be integrated into the processor, or may be independent of the processor.

In some possible implementations, the communications apparatus includes a processor. The processor is configured to: be coupled to a memory, read an instruction from a memory, and perform, according to the instruction, the method performed by the mobility management network element in any one of the foregoing aspects or any possible implementation of any one of the foregoing aspects.

According to a fifteenth aspect, a communications apparatus is provided. The communications apparatus includes a processor, a memory, and a transceiver. The processor is connected to the memory and the transceiver. The memory is configured to store an instruction. The processor is configured to execute the instruction. The transceiver is configured to communicate with another network element under control of the processor. When the processor executes the instruction stored in the memory, the execution enables the processor to perform the method in any one of the foregoing aspects or any possible implementation of any one of the foregoing aspects.

According to a sixteenth aspect, a computer-readable storage medium is provided. The computer-readable storage medium stores a program, and the program enables a communications apparatus to perform any method for selecting a session management network element in any one of the foregoing aspects or any implementation of the foregoing aspects.

According to a seventeenth aspect, this application further provides a computer program product including an instruction. When the computer program product runs on a computer, the computer is enabled to perform any method for selecting a session management network element in the foregoing aspects.

According to an eighteenth aspect, this application further provides a system. The system includes a service communication proxy network element. The service communication proxy network element may be configured to perform the steps performed by the service communication proxy network element in the first aspect or any implementation of the first aspect.

In some possible implementations, the system may further include a mobility management network element. The mobility management network element may be configured to perform the steps performed by the mobility management network element in the second aspect or any implementation of the second aspect.

In some possible implementations, the system may further include another device that interacts with the service communication proxy network element and/or the mobility management network element in the solutions provided in the embodiments of this application, and the like.

According to a nineteenth aspect, this application further provides a system. The system includes a service communication proxy network element. The service communication proxy network element may be configured to perform the steps performed by the service communication proxy network element in the third aspect or any implementation of the third aspect.

In some possible implementations, the system may further include a mobility management network element. The mobility management network element may be configured to perform the steps performed by the mobility management network element in the fourth aspect or any implementation of the fourth aspect.

In some possible implementations, the system may further include another device that interacts with the service communication proxy network element and/or the mobility management network element in the solutions provided in the embodiments of this application, and the like.

According to a twentieth aspect, this application further provides a system. The system includes a service communication proxy network element. The service communication proxy network element may be configured to perform the steps performed by the service communication proxy network element in the fifth aspect or any implementation of the fifth aspect.

In some possible implementations, the system may further include a mobility management network element. The mobility management network element may be configured to perform the steps performed by the mobility management network element in the sixth aspect or any implementation of the sixth aspect.

In some possible implementations, the system may further include another device that interacts with the service communication proxy network element and/or the mobility management network element in the solutions provided in the embodiments of this application, and the like.

According to a twenty-first aspect, this application further provides a system. The system includes a service communication proxy network element. The service communication proxy network element may be configured to perform the steps performed by the service communication proxy network element in the seventh aspect or any implementation of the seventh aspect.

In some possible implementations, the system may further include a mobility management network element. The mobility management network element may be configured to perform the steps performed by the mobility management network element in the eighth aspect or any implementation of the eighth aspect.

In some possible implementations, the system may further include another device that interacts with the service communication proxy network element and/or the mobility management network element in the solutions provided in the embodiments of this application, and the like.

According to a twenty-second aspect, this application further provides a system. The system includes a service communication proxy network element. The service communication proxy network element may be configured to perform the steps performed by the service communication proxy network element in the ninth aspect or any implementation of the ninth aspect.

In some possible implementations, the system may further include a mobility management network element. The mobility management network element may be configured to perform the steps performed by the mobility management network element in the tenth aspect or any implementation of the tenth aspect.

In some possible implementations, the system may further include another device that interacts with the service communication proxy network element and/or the mobility management network element in the solutions provided in the embodiments of this application, and the like.

According to a twenty-third aspect, this application further provides a system. The system includes a service communication proxy network element. The service communication proxy network element may be configured to perform the steps performed by the service communication proxy network element in the eleventh aspect or any implementation of the eleventh aspect.

In some possible implementations, the system may further include a mobility management network element. The mobility management network element may be configured to perform the steps performed by the mobility management network element in the twelfth aspect or any implementation of the twelfth aspect.

In some possible implementations, the system may further include another device that interacts with the service communication proxy network element and/or the mobility management network element in the solutions provided in the embodiments of this application, and the like.

According to a twenty-fourth aspect, a communications chip is provided. The communications chip stores an instruction, and when the instruction is run on a communications device, the communications chip is enabled to perform the method in any one of the foregoing aspects or any possible implementation of any one of the foregoing aspects.

DESCRIPTION OF EMBODIMENTS

Figure 1:
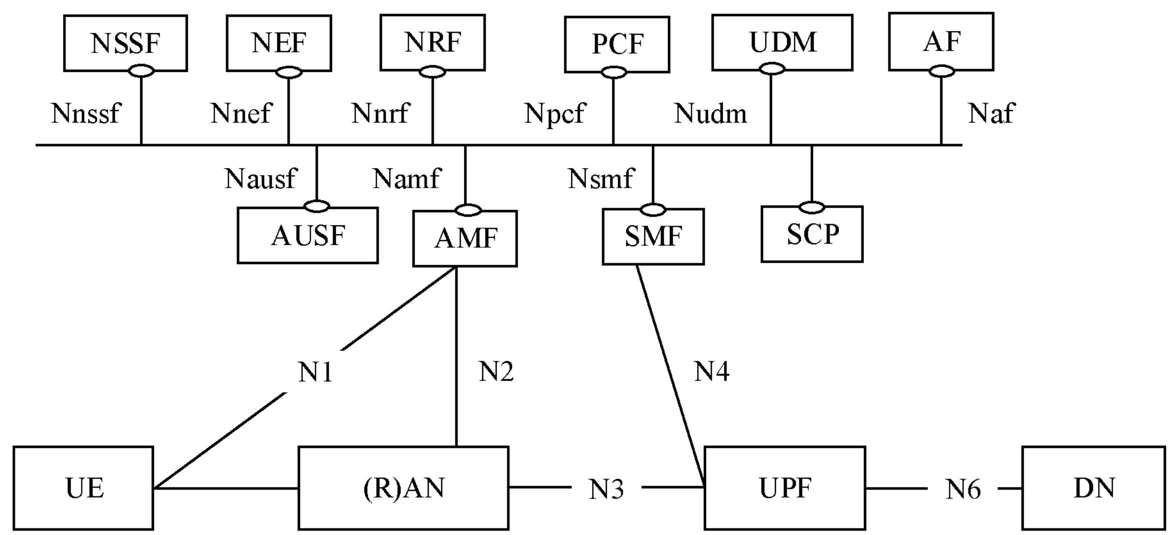
FIG. 1 is an example diagram of a system architecture to which an embodiment of this application is applicable.

The following describes the technical solutions of this application with reference to the accompanying drawings.

In the embodiments of this application, "a plurality of" may be understood as "at least two"; and "a plurality of items" may be understood as "at least two items".

The technical solutions of the embodiments of this application may be applied to various communications systems, such as a Global System for Mobile Communications (GSM) system, a code-division multiple access (CDMA) system, a wideband code-division multiple access (WCDMA) system, a General Packet Radio Service (GPRS), a Long-Term Evolution (LTE) system, an LTE frequency-division duplex (FDD) system, an LTE time-division duplex (TDD), a universal mobile telecommunications system (UMTS), a Worldwide Interoperability for Microwave Access (WiMAX) communications system, a future 5th generation (5G) system, or a new radio (NR) system.

Aspects or features of this application may be implemented as methods, apparatuses or products that use standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

A UE in the embodiments of this application may be a terminal, an access terminal, a terminal in vehicle-to-everything (V2X) communication, a subscriber unit, a subscriber station, a mobile station, a mobile console, a remote station, a remote terminal, a mobile device, a user terminal, a terminal device, a wireless communications device, a user agent, a user apparatus, or the like. The terminal may be alternatively a cellular phone, a cordless phone, a Session Initiation Protocol (SIP) phone, a wireless local loop (WLL) station, a personal digital assistant (PDA), a handheld device with a wireless communication function, a computing device or another processing device connected to a wireless modem, a vehicle-mounted device, a V2X device (for example, a vehicle or an on-board unit (OBU) in a vehicle), a wearable device, a terminal device in a future 5G network, or a terminal device in a future evolved public land mobile network (PLMN). This is not limited in the embodiments of this application.

A session management network element is mainly configured to perform session management in a mobile network, such as session establishment, modification, and release, including tunnel maintenance between a UPF and an access network (AN), selection and control of a UPF, selection of an SSC (service and session continuity, service and session continuity) mode, roaming, and other session-related functions. Specific functions are, for example, assignment of internet protocol (IP) addresses to users, and selection of a user plane network element that provides a packet forwarding function. In 5G, the session management network element may be a session management function (SMF) network element. In future communication such as $6^{th}$ generation (6G), the session management network element may still be an SMF network element or have another name. This is not limited in this application.

A communication proxy network element mainly has a function of message forwarding between network elements, and a service discovery function. In 5G, the communication proxy network element may be a service communication proxy (SCP) network element. In future communication such as 6G, the communication proxy network element may still be an SCP network element or have another name. This is not limited in this application.

A mobility management network element mainly includes the following functionalities: connection management, mobility management, registration management, access authentication and authorization, reachability management, and security context management, and other access- and mobility-related functions. In 5G, the mobility management network element may be an access and mobility management function (AMF) network element. In future communication such as 6G, the mobility management network element may be an AMF network element or have another name. This is not limited in this application.

A policy control network element includes the following functionalities: user subscription data management, policy control, charging policy control, policy control provision, obtaining policy decision-related subscription information from a unified data repository (UDR), and other policy-related functions, quality of service (QoS) control, and the like. In 5G, the policy control network element may be a policy control function (PCF) network element. In future communication such as 6G, the policy control network element may still be a PCF network element or have another name. This is not limited in this application.

An authentication server network element is mainly configured to perform service authentication according to an extensible authentication protocol (EAP), store a key, perform server authentication, interact with a UDM to obtain user information, and perform an authentication-related function, for example, generate an intermediate key to perform authentication and authorization for a user. In 5G, the authentication server network element may be an authentication server function (AUSF) network element. In future communication such as 6G, the authentication server network element may still be an AUSF network element or have another name. This is not limited in this application.

A data management network element is mainly configured to store user data such as subscription information and authentication/authorization information. In 5G, the data management network element may be a unified data management (UDM) network element. In future communication such as 6G, the data management network element may still be a UDM network element or have another name. This is not limited in this application. A unified data manager (UDM) mainly includes the following functionalities: unified data management, authentication credential processing in a 3GPP authentication and key negotiation mechanism, user identity processing, access authorization, registration and mobility management, subscription management, short message service (SMS) management, and the like.

A user plane network element mainly includes the following functionalities: service processing on a user plane, for example, service routing, packet forwarding, anchoring, quality of service (QoS) mapping and execution, identification of an uplink identifier and routing to a data network, downlink packet buffering, notification triggering of downlink data arrival, connection to an external data network, and the like. In 5G, the user plane network element may be a user plane function (UPF) network element. In future communication such as 6G, the user plane network element may still be a UPF network element or have another name. This is not limited in this application.

An access network device, also referred to as a radio access network (RAN) device, is a device that provides a wireless communication function for a terminal device. The access network device includes but is not limited to: a next generation NodeB (gNodeB or gNB) in 5G, an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a transmission reception point (TRP), a transmission point (TP), a mobile switching center, or the like. A specific technology and a specific device form used by the access network device are not limited in the embodiments of this application.

A terminal device (e.g., UE) is a device that has a wireless transceiver function. The terminal device may be deployed on the land. For example, the terminal device is an indoor device, an outdoor device, a handheld device, or a vehicle-mounted device. Alternatively, the terminal device may be deployed on the water (for example, on a ship). Alternatively, the terminal device may be deployed in the air (for example, on a plane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

A data network (DN) is mainly used to provide services for users, for example, operator services, internet access services, and third-party services.

A network exposure function (NEF) mainly includes the following functionalities: secure exposure of services and capabilities provided by a 3GPP network function for, for example, for the NEF or a third party; and translation of information exchanged with an application function (AF) and information exchanged with an internal network function. For example, the NEF translates between an AF-Service-Identifier and internal 5G Core information such as DNN and single network slice selection assistance information (S-NSSAI).

A network function (NF) or network repository function (NRF) mainly includes the following functionalities: supporting a service discovery function, and maintaining an NF profile of available network function instances and their supported services.

An application function (AF) mainly includes the following functionalities: interacting with a 3GPP core network to provide services, including interacting with an NEF, interacting with a policy architecture, and the like.

A network slice selection function (NSSF) mainly includes the following functionalities: selecting a group of network slice instances for a UE, determining an allowed NSSAI, determining an AMF set that can serve the UE, and the like.

It may be understood that the foregoing network elements or functions may be network components on a hardware device, software functions running on dedicated hardware, or virtualized functions instantiated on a platform (for example, a cloud platform). The foregoing functions may be classified into one or more services. Further, a service independent of a network function may further exist. In this application, an instance of the foregoing function, an instance of a service included in the foregoing function, or a service instance independent of the network function may be referred to as a service instance.

Optionally, the network element or the function may be implemented by one device, by a plurality of devices, or by a functional module in a device. This is not specifically limited in the embodiments of this application.

It should be understood that unified descriptions are provided herein. The descriptions of the functions included in each network element are also applicable to the network elements described hereinafter. Details are not described again.

FIG. 1 is an example diagram of a system architecture to which an embodiment of this application is applicable. A network element in the system architecture includes a control plane function and a user plane network function (such as a UPF). The control plane function performs communication through a service-based interface. An interface between the control plane function and an access network or the UPF is a non-service-based interface. For example, control plane network functions may include an AMF, an SMF, a policy control function (PCF), a UDM, an AUSF, and the like. As shown in FIG. 1, the system architecture includes the authentication server function AUSF, the AMF, the SMF, a service communication proxy (SCP), an NSSF, an NEF, an NRF, the PCF, the UDM, an AF, the UPF, a DN, a RAN, and a user equipment (UE). The control plane functions communicate with each other through the following service-based interfaces: an Nnssf exhibited by the NSSF, an Nnef exhibited by the NEF, an Nnrf exhibited by the NRF, an Namf exhibited by the AMF, an Nsmf exhibited by the SMF, an Nudm exhibited by the UDM, an Naf exhibited by the AF, an Npcf exhibited by the PCF, and an Nausf exhibited by the AUSF. An interface between the control plane function and the RAN and an interface between the control plane function and the UPF are non-service-based interfaces. For related descriptions, refer to a 5G system architecture (5G system architecture) in 3GPP standard Technical Specification (TS) 23.501. The AMF is connected to the RAN through an N2 interface, and is connected to the UE through an N1 interface. The SMF is connected to the UPF through an N4 interface. The RAN is connected to the UPF through an N3 interface. The UPF is connected to the DN through an N6 interface. In an indirect communication mode, the SCP is configured to transfer messages between control plane network elements and support network element discovery and network function discovery.

It should be noted that names of the network elements (such as the SCP, the AMF, and the SMF) included in FIG. 1 do not constitute any limitation on the functions of the network elements. In a 5G network and another future network, the foregoing network elements may alternatively have other names. This is not specifically limited in the embodiments of this application. For example, in a 6G network, some or all of the foregoing network elements may still use the names of the terms in 5G, or may have other names, or the like. This is uniformly described herein. Details are not described hereinafter.

It should be understood that whether the interfaces in FIG. 1 are service-based interfaces does not constitute any limitation on the protection scope of the embodiments of this application. For example, if a non-service-based interface in FIG. 1 is evolved into a service-based interface in future, the embodiments of this application are still applicable.

It is uniformly described herein that the embodiments described hereinafter may be applicable to another scenario in which both two network elements need to be discovered in a delegated discovery mode currently, for example, a scenario in which an H-PCF and a V-PCF are selected in the delegated discovery mode.

It is uniformly described herein that, for ease of description, the following uses an example in which a session management network element is an SMF for description. However, this does not constitute any limitation on the embodiments of this application.

Figure 2:
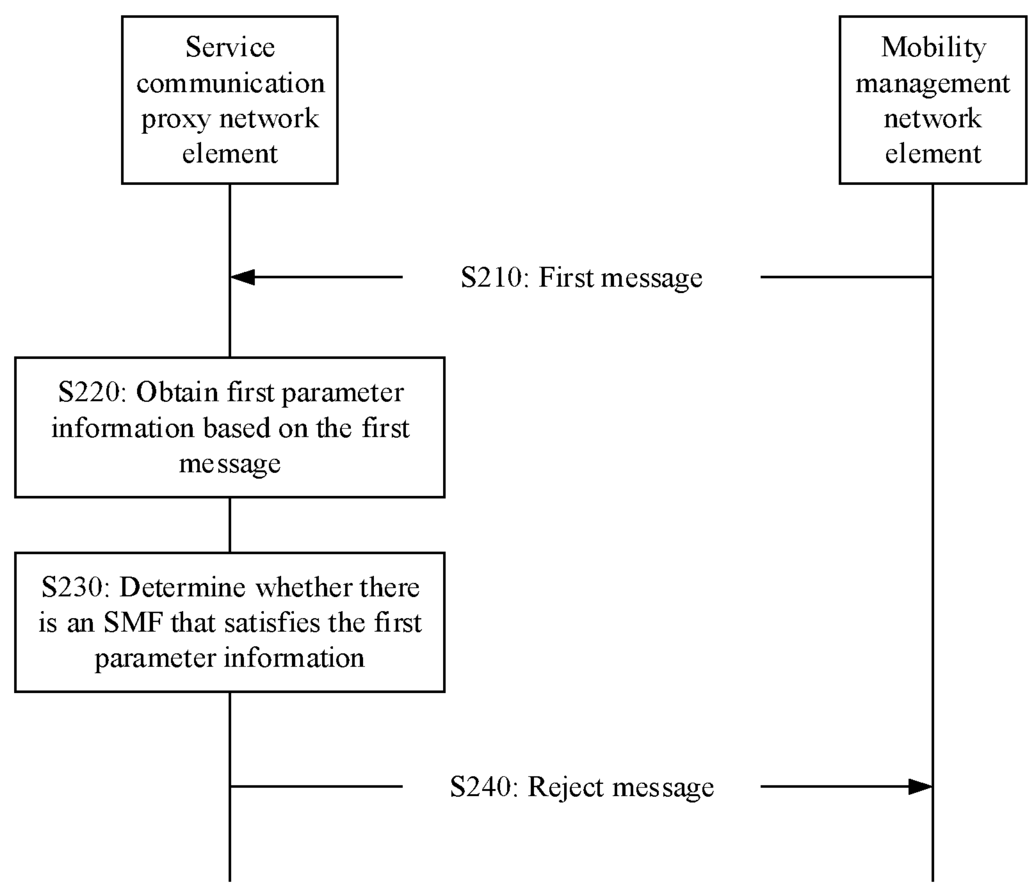
FIG. 2 is a schematic interaction diagram of a method for selecting a session management network element according to an embodiment of this application.

FIG. 2 is a schematic interaction diagram of a method 200 for selecting a session management network element according to an embodiment of this application. In the method 200, a method on a service communication proxy network element side may be performed by a service communication proxy network element (for example, an SCP) or a chip (or a module) in a service communication proxy network element, and a method on a mobility management network element side may be performed by a mobility management network element (for example, an AMF) or a chip (or a module) in a mobility management network element. As shown in FIG. 2, the method 200 includes the following steps.

S210: The mobility management network element sends a first message to the service communication proxy network element. Accordingly, the service communication proxy network element receives the first message.

Optionally, the first message may be a first request message, and first parameter information may be carried in a header or a message body of the first request message. This is not limited.

S220: The service communication proxy network element obtains the first parameter information based on the first message.

The first message is used to request the service communication proxy network element to select an SMF based on the first parameter information and obtain the first request message based on the first message, and send the first request message to the SMF.

Optionally, the first request message may be used to request to establish a session. For example, when receiving a session establishment request message of UE, the mobility management network element needs to send the session establishment request message to the SMF, such that the SMF may establish the session for the UE. The mobility management network element generates the first request message based on the session establishment request message of the UE, and determines a parameter for selecting the SMF. If the mobility management network element works in a delegated discovery mode, the mobility management network element may send, to the service communication proxy network element, the first request message together with the parameter for selecting the SMF.

Herein, the first parameter information includes UE location information and a data network name DNN. For example, a logic expression of the first parameter information is: UE location & DNN.

Optionally, the first parameter information may further include network slice information, for example, S-NSSAI. For example, a logic expression of the first parameter information is: UE location & DNN & S-NSSAI.

S230: The service communication proxy network element determines whether there is an SMF that satisfies the first parameter information.

Optionally, after obtaining the first parameter information, the service communication proxy network element may query an NRF to determine whether there is an SMF that satisfies both the UE location information and the DNN.

S240: When there is no SMF that satisfies the first parameter information, the service communication proxy network element selects one or more first SMFs that support the DNN, and sends a reject message to the mobility management network element, where the reject message includes information about the one or more first SMFs.

If the service communication proxy network element does not discover an SMF that satisfies both the UE location information and the DNN, the service communication proxy network element selects a list of SMFs (for example, the one or more first SMFs) that support the DNN, then adds the information about the one or more first SMFs to the list, and sends, to the mobility management network element, the list including the information about the one or more first SMFs. The information about the one or more first SMFs includes one or more of the following information: an identifier (for example, an instance identifier (ID)), an endpoint address, and service area information that are of the first SMF.

Herein, the service communication proxy network element may perform step S240 based on target network element type indication information or first indication information.

Optionally, the first parameter information may further include the target network element type indication information. If the target network element indication information is used to indicate the service communication proxy network element to select an SMF, when the service communication proxy network element determines that there is no SMF that satisfies the first parameter information, the service communication proxy network element selects the one or more first SMFs that support the DNN, and sends the information about the one or more first SMFs to the mobility management network element.

Optionally, the service communication proxy network element receives the first indication information from the mobility management network element, where the first indication information is used to indicate the service communication proxy network element to select, when the service communication proxy network element determines that there is no SMF that satisfies the first parameter information, the one or more first SMFs that support the DNN, and send the information about the one or more first SMFs to the mobility management network element. If the service communication proxy network element receives the first indication information, when the service communication proxy network element does not discover an SMF that satisfies both the UE location information and the DNN, the service communication proxy network element selects a list of SMFs (for example, the one or more first SMFs) that support the DNN, and then sends the information about the one or more first SMFs to the mobility management network element. It should be further noted that the first indication information is further used to indicate the service communication proxy network element to send the first request message to the SMF only when the SMF selected by the service communication proxy network element meets both the UE location information and the DNN. Therefore, even if the service communication proxy network element selects the SMF (for example, the one or more first SMFs) that support the DNN, because the SMF selected by the service communication proxy network element does not support the UE location information, the service communication proxy network element does not send the first request message to the SMF yet.

Optionally, the first indication information may be carried in the first parameter information.

Optionally, in an implementation, the first parameter information sent by the mobility management network element to the service communication proxy network element includes a description of a logical relationship between first parameters. For example, when the first parameter includes the DNN and the UE location information, the logical relationship is described as: (DNN AND UE location information) OR (DNN). The logical relationship indicates the service communication proxy network element to select an SMF that satisfies both the DNN and the UE location information, or select an SMF that satisfies the DNN. Accordingly, the service communication proxy network element obtains, based on the logical relationship, an SMF network element that satisfies the logical relationship.

Therefore, in this embodiment of this application, the service communication proxy network element sends the information about the one or more first SMFs that support the DNN to the mobility management network element, such that the mobility management network element may obtain the information about the first SMF, to perform a subsequent operation. In this way, the mobility management network element may send the information about the first SMF to a second SMF. For example, in a home routed mode, the mobility management network element may send received information about an H-SMF to a V-SMF. In an enhanced topology mode, the mobility management network element may send information about an I-SMF to an SMF. In this way, regardless of the home routed mode or the enhanced topology mode, the method 200 for selecting a session management network element in this embodiment of this application is applicable.

If the mobility management network element receives the reject message, and the reject message includes the list of first SMFs selected by the service communication proxy network element, the mobility management network element determines that a second SMF (for example, the second SMF may be the I-SMF) needs to be selected. The mobility management network element may regenerate parameter information, that is, second parameter information, where the second parameter information is used to discover the second SMF.

Figure 3:
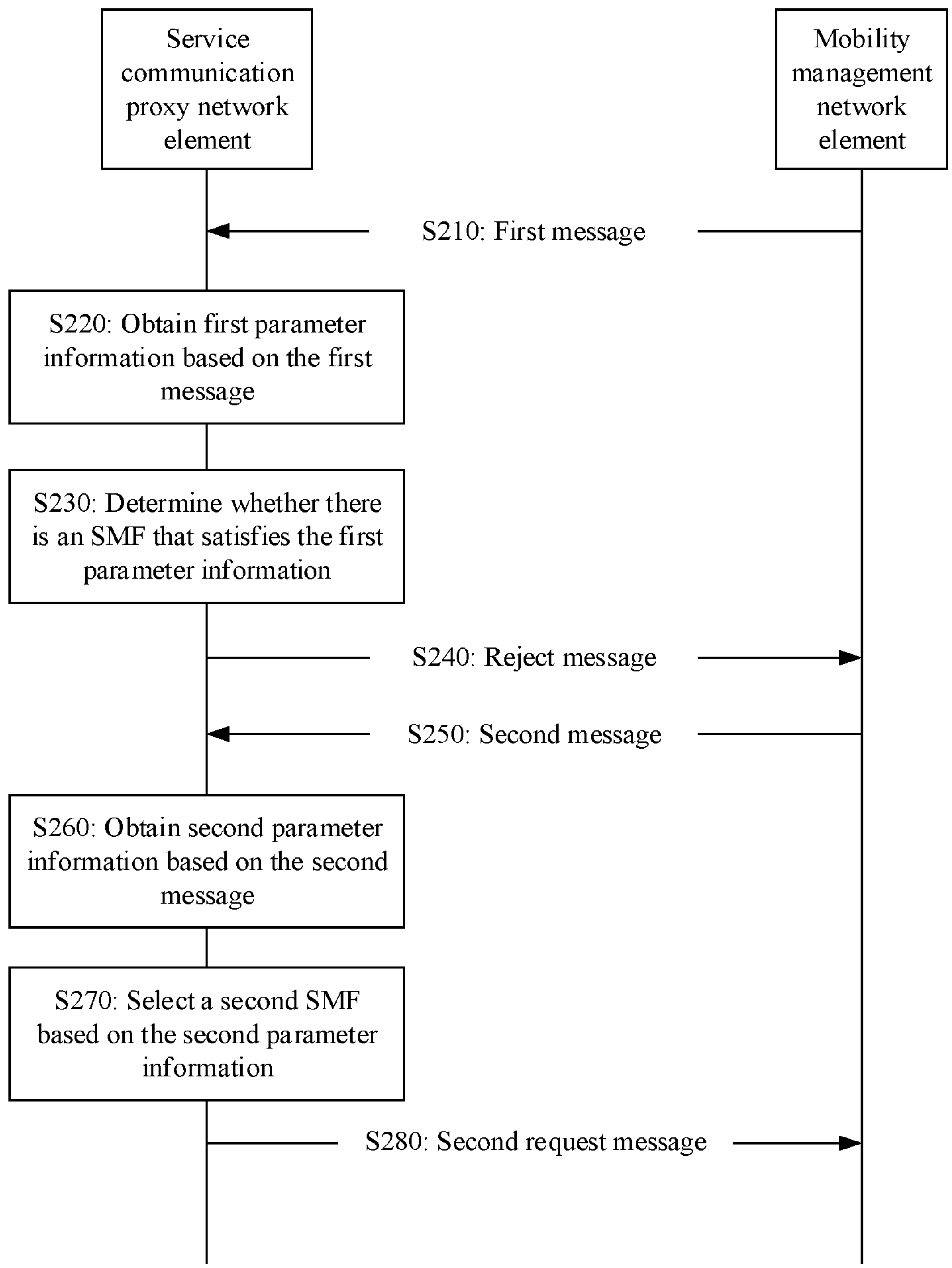
FIG. 3 is another schematic interaction diagram of a method for selecting a session management network element according to the embodiment corresponding to FIG. 2.

Optionally, as shown in FIG. 3, the method 200 further includes the following steps.

S250: The mobility management network element sends a second message to the service communication proxy network element. The service communication proxy network element receives the second message from the mobility management network element.

Optionally, the second message includes the second parameter information and information about one or more third SMFs in the one or more first SMFs. The second parameter information includes the UE location information. The information about the one or more third SMFs is sent to the second SMF.

S260: The service communication proxy network element obtains the second parameter information based on the second message, where the second parameter information includes the UE location information. Herein, the second parameter information does not carry the DNN but carries the UE location information, to facilitate selection of the second SMF. Optionally, in the home routed mode, the second parameter information does not carry an HPLMN ID.

Optionally, the second message may be understood as a second request message, and the second parameter information may be carried in a header or a message body of the second request message. This is not limited. Optionally, the second request message may include information about the one or more third SMFs in the one or more first SMFs. Optionally, the information about the third SMF is included in the message body of the second request message.

S270: The service communication proxy network element selects the second SMF based on the second parameter information.

The service communication proxy network element performs a discovery process based on the second parameter information (including the UE location information), and selects the second SMF that supports the UE location information. It should be understood that, for the discovery process performed by the service communication proxy network element, refer to descriptions in an existing protocol. For brevity, details are not described herein.

Optionally, the second parameter information includes network element type information, and the network element type information is used to indicate the service communication proxy network element to select an intermediate SMF.

S280: The service communication proxy network element obtains the second request message based on the second message, and sends the second request message to the second SMF.

If the service communication proxy network element discovers the second SMF that supports the UE location information, the service communication proxy network element sends the second request message to the selected second SMF. For example, in the second request message that is sent by the mobility management network element, the service communication proxy network element needs to change a host name to an address or a fully qualified domain name (FQDN) corresponding to the selected second SMF.

Optionally, after receiving the second request message, the second SMF may perform an operation related to the second request message. For example, if the second request message is used to establish a session, the second SMF creates a session resource for the second request message. If the second request message includes information about a specified SMF, the second SMF may further interact with the specified SMF, to establish the session on the specified SMF. Herein, for a process of processing a session between the second SMF and the specified SMF, refer to descriptions in other approaches. For brevity, details are not described herein.

Optionally, after performing the operation related to the second request message, the second SMF may send, to the mobility management network element, an execution success message (for example, a session establishment success message), namely, a response message. Optionally, in the delegated discovery mode, the second SMF may first send the response message to the service communication proxy network element, such that the service communication proxy network element forwards the response message to the mobility management network element. The service communication proxy network element may add information about the second SMF, and then forward, to the mobility management network element, the response message that includes the information about the second SMF.

Optionally, the method 200 further includes: The service communication proxy network element sends the information about the second SMF to the mobility management network element.

For example, after receiving the response message of the second SMF, the service communication proxy network element may be configured to: add the information about the second SMF to the response message; and send, to the mobility management network element, the response message that includes the information about the second SMF. Optionally, the information about the second SMF may be included in a header or a message body of the response message. This is not limited in this embodiment of this application.

Optionally, the information about the second SMF includes at least service area information of the second SMF. Optionally, the information about the second SMF may further include identification information of the second SMF, for example, an intermediate SMF (I-SMF) instance identifier.

Optionally, the mobility management network element may further send the identification information of the second SMF to a target mobility management network element. As such, the target mobility management network element obtains the service area information of the second SMF based on the identification information of the second SMF, and the target mobility management network element determines whether to replace the existing SMF with the second SMF. Optionally, after obtaining the service area information of the second SMF, the mobility management network element may send the service area information of the second SMF to a target mobility management network element, such that the target mobility management network element determines, based on the service area information of the second SMF, whether to replace the existing SMF with the second SMF.

It is uniformly described herein that, in the embodiments of this application (including the first SMF and the second SMF described hereinafter), in the home routed mode, the first SMF may be an H-SMF and the second SMF may be a V-SMF; and in the enhanced topology mode, the first SMF is an SMF and the second SMF is an I-SMF.

If the first SMF is the H-SMF and the second SMF is the V-SMF, the first parameter information further includes a home public land mobile network (HPLMN) ID. The first parameter information is used to discover a home session management function H-SMF. The reject message includes information about one or more H-SMFs.

Herein, the service communication proxy network element may determine whether there is an SMF that satisfies UE location information, the DNN, and the HPLMN ID. If there is no SMF that satisfies the UE location information, the DNN, and the HPLMN ID, the service communication proxy network element may select the one or more H-SMFs that support the HPLMN ID and the DNN.

Figure 4:
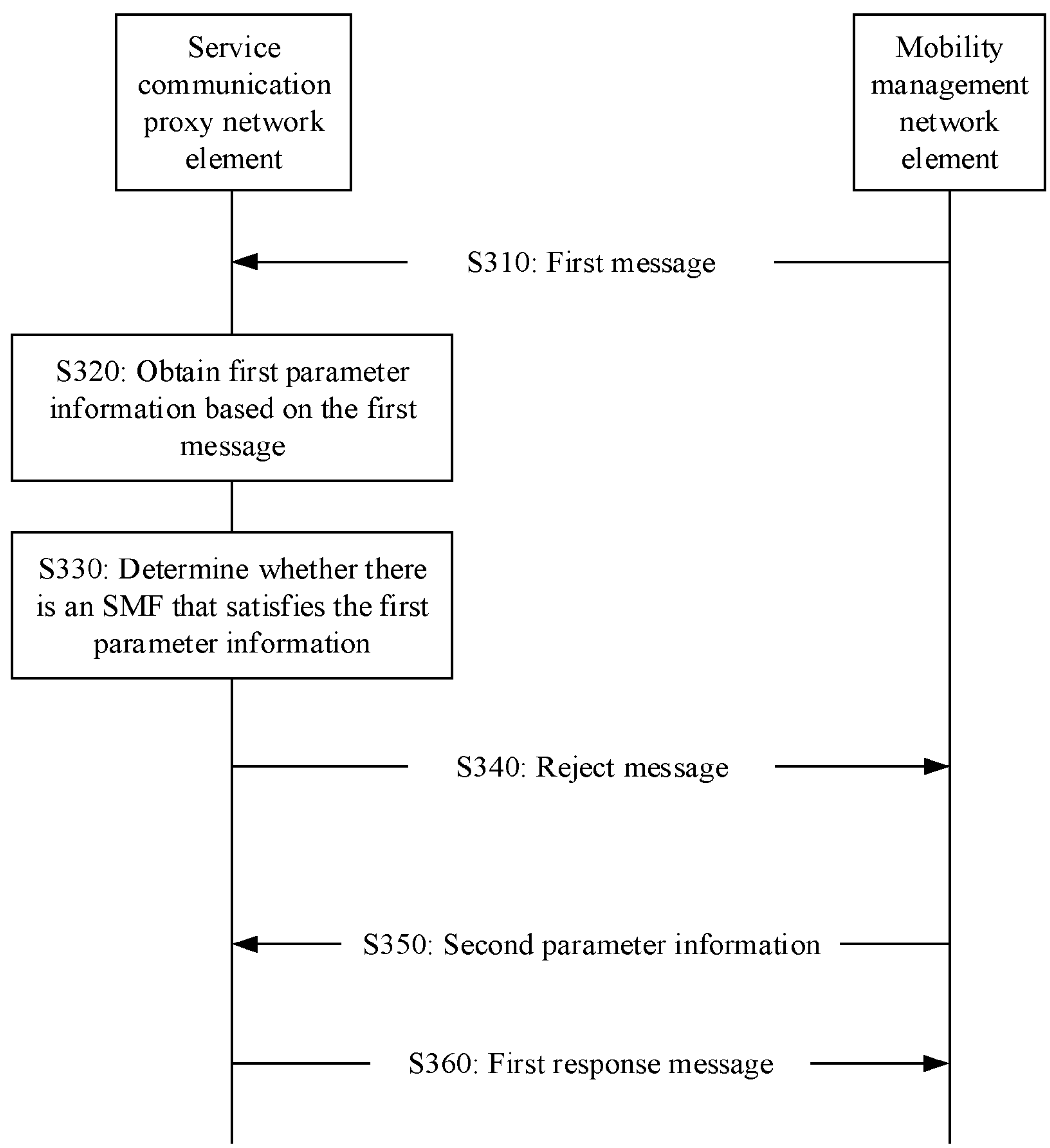
FIG. 4 is a schematic interaction diagram of a method for selecting a session management network element according to another embodiment of this application.

This application further provides another method for selecting an SMF. FIG. 4 is a schematic interaction diagram of a method 300 for selecting an SMF according to another embodiment of this application. In the method 300, a method on a service communication proxy network element side may be performed by a service communication proxy network element (for example, an SCP) or a chip (or a module) in a service communication proxy network element, and a method on a mobility management network element side may be performed by a mobility management network element (for example, an AMF) or a chip (or a module) in a mobility management network element. As shown in FIG. 4, the method 300 includes the following steps.

S310: The mobility management network element sends a first message to the service communication proxy network element. Accordingly, the service communication proxy network element receives the first message.

Herein, for an explanation of the first message, refer to the description of the first message in the method 200. For brevity, details are not described herein again.

S320: The service communication proxy network element obtains first parameter information based on the first message, where the first message is used to request the service communication proxy network element to obtain, after the service communication proxy network element selects an SMF based on the first parameter information, a first request message based on the first message, and send the first request message to the SMF.

Herein, for an explanation of the first message or an explanation of the first parameter information, refer to the description of the first message in the method 200 or the description of the first parameter information in the method 200. For brevity, details are not described herein again.

S330: The service communication proxy network element determines whether there is an SMF that satisfies the first parameter information.

It should be understood that, for related descriptions or explanations of steps S310 to S330, refer to the descriptions of steps S210 to S230 in the method 200. Details are not described herein again.

S340: When there is no SMF that satisfies the first parameter information, the service communication proxy network element sends a reject message to the mobility management network element, where the reject message is used to indicate that there is no SMF that satisfies the first parameter information.

If the service communication proxy network element does not discover an SMF that satisfies both UE location information and a DNN, the service communication proxy network element sends the reject message to the mobility management network element, to notify the mobility management network element that there is no SMF that satisfies the first parameter information. Optionally, the reject message may carry a cause value. The cause value is used to indicate, to the mobility management network element, that the service communication proxy network element does not discover an SMF that satisfies the first parameter information. A difference from step S240 in the method 200 lies in that, the reject message herein does not include one or more first SMFs that support the DNN and that are selected by the service communication proxy network element.

Optionally, after obtaining the first parameter information, the service communication proxy network element may store the DNN and the UE location information.

After receiving the reject message, the mobility management network element determines, based on the cause value of the reject message, that two SMFs, for example, an I-SMF and an SMF, need to be selected.

S350: The service communication proxy network element receives second parameter information from the mobility management network element, where the second parameter information includes the DNN.

Herein, the second parameter information includes the DNN. The service communication proxy network element selects an SMF based on the DNN.

S360: The service communication proxy network element selects one or more first SMFs that support the second parameter information, and sends a first response message to the mobility management network element, where the first response message includes information about the one or more first SMFs.

In other words, if selecting the one or more first SMFs that support the second parameter information, the service communication proxy network element sends the information about the one or more first SMFs to the mobility management network element. Herein, for explanations or related descriptions of the information about the one or more first SMFs, refer to the descriptions in the method 200. For brevity, details are not described herein again.

Herein, the service communication proxy network element may perform step S360 based on target network element type indication information or first indication information.

Optionally, the second parameter information may further include first target network element type indication information. If the first target network element indication information is used to indicate the service communication proxy network element to select an SMF, the service communication proxy network element selects the one or more first SMFs that support the DNN, and sends the first response message to the mobility management network element. In other words, the service communication proxy network element does not send, to the first SMF, a message from the mobility management network element.

Optionally, the second parameter information further includes the first indication information, and the first indication information is used to indicate the service communication proxy network element to select the one or more first SMFs that support the DNN, and send the first response message to the mobility management network element. If the service communication proxy network element receives the first indication information, the service communication proxy network element selects the one or more first SMFs that support the DNN, and does not send ae request message to the first SMF but sends the information about the one or more first SMFs to the mobility management network element. In other words, the service communication proxy network element does not send the message to the selected first SMF.

Therefore, in this embodiment of this application, the service communication proxy network element sends the information about the one or more first SMFs that support the DNN to the mobility management network element. As such, the mobility management network element may obtain the information about the first SMF, to perform a subsequent operation. In this way, the mobility management network element may send the information about the first SMF to a second SMF. For example, in an enhanced topology mode, the mobility management network element may send information about an I-SMF to an SMF.

Figure 5:
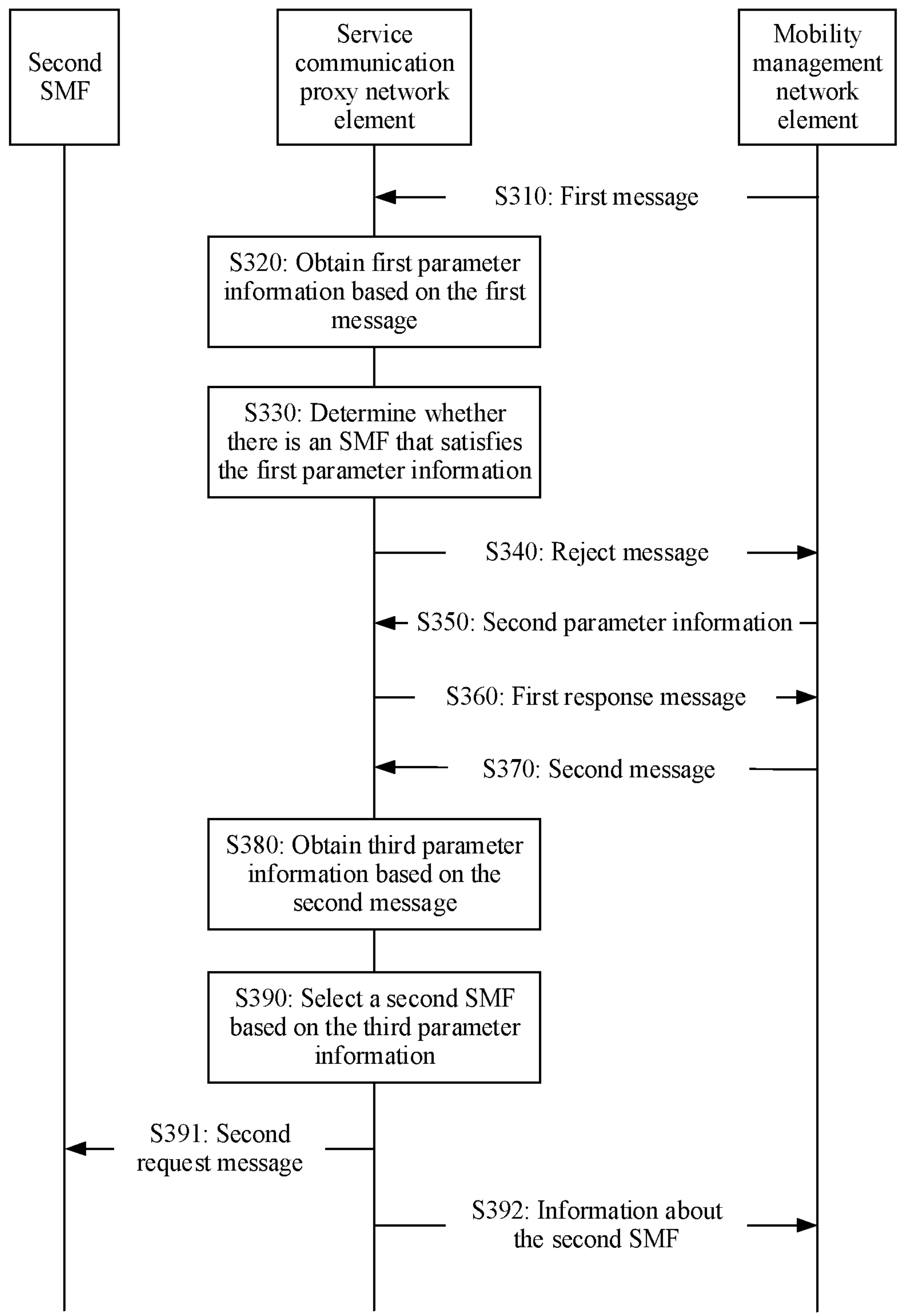
FIG. 5 is another schematic interaction diagram of a method for selecting a session management network element according to the embodiment corresponding to FIG. 4.

Optionally, as shown in FIG. 5, the method 300 further includes the following steps.

S370: The mobility management network element sends a second message to the service communication proxy network element. The service communication proxy network element receives the second message from the mobility management network element. Optionally, the second message includes third parameter information.

S380: The service communication proxy network element obtains the third parameter information based on the second message, where the third parameter information includes the UE location information. Herein, the third parameter information does not carry the DNN but carries the UE location information, to facilitate selection of the second SMF.

Optionally, the second message may be understood as a second request message, and the third parameter information may be carried in a header or a message body of the second request message. This is not limited. Optionally, the second request message may include information about one or more SMFs in the one or more first SMFs.

S390: The service communication proxy network element selects the second SMF based on the third parameter information.

The service communication proxy network element performs a discovery process based on the third parameter information (including the UE location information), and selects the second SMF that supports the UE location information. It should be understood that, for the discovery process performed by the service communication proxy network element, refer to descriptions in an existing protocol. For brevity, details are not described herein.

Optionally, the third parameter information may further include second target network element type indication information, and the second target network element type indication information is used to indicate an intermediate SMF (I-SMF). If the service communication proxy network element obtains the second target network element type indication information, when the service communication proxy network element selects an SMF that supports the UE location information, the service communication proxy network element needs to select an SMF whose network element type conforms to a network element type indicated by the second target network element type indication information. In other words, the service communication proxy network element selects an intermediate SMF that supports the UE location information.

S391: The service communication proxy network element obtains the second request message based on the second message, and sends the second request message to the second SMF.

If the service communication proxy network element discovers the second SMF that supports the UE location information, the service communication proxy network element sends the second request message to the selected second SMF. For example, in the second request message that is sent by the mobility management network element, the service communication proxy network element needs to change a host name to an address or an FQDN corresponding to the selected second SMF.

Herein, for a subsequent operation after the second SMF receives the second request message, refer to the descriptions in the method 200. For brevity, details are not described herein again.

Optionally, the method 300 further includes S392: The service communication proxy network element sends information about the second SMF to the mobility management network element.

For example, after receiving a response message of the second SMF, the service communication proxy network element may add the information about the second SMF to the response message, and send, to the mobility management network element, the response message that includes the information about the second SMF.

Optionally, the information about the second SMF includes at least service area information of the second SMF. Optionally, the information about the second SMF may further include identification information of the second SMF, for example, an I-SMF instance identifier.

Herein, for related descriptions of the identification information of the second SMF, refer to the descriptions in the method 200. For brevity, details are not described herein again.

Figure 6:
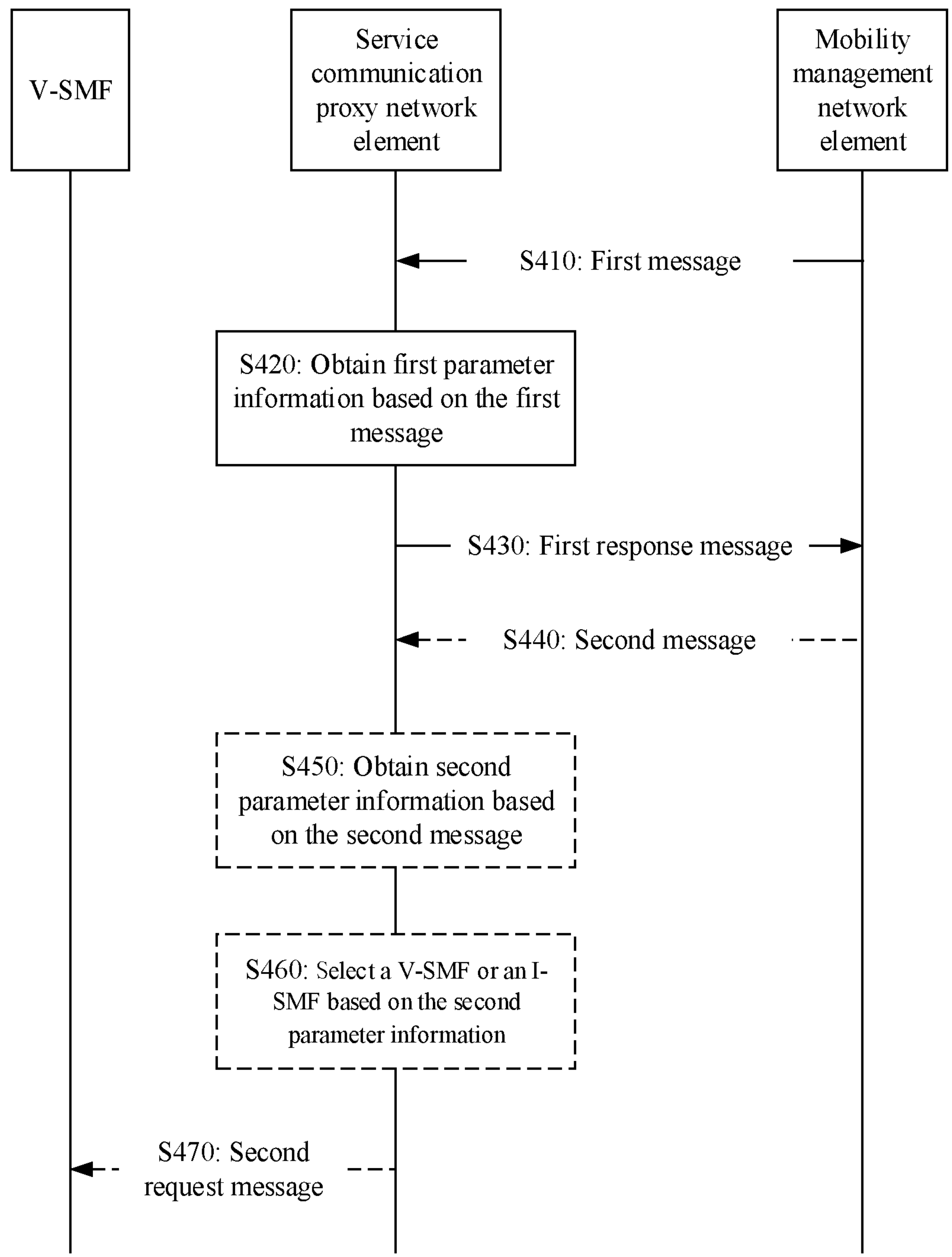
FIG. 6 is a schematic interaction diagram of a method for selecting a session management network element according to yet another embodiment of this application.

This application further provides still another method for selecting an SMF. FIG. 6 is a schematic interaction diagram of a method 400 for selecting an SMF according to still another embodiment of this application. The method 400 supports a scenario in which SMFs are selected in a home routed mode, and also supports a scenario in which two SMFs need to be selected in a non-home-routed mode. In the method 400, a method on a service communication proxy network element side may be performed by a service communication proxy network element (for example, an SCP) or a chip (or a module) in a service communication proxy network element, and a method on a mobility management network element side may be performed by a mobility management network element (for example, an AMF) or a chip (or a module) in a mobility management network element. As shown in FIG. 6, the method 400 includes the following steps.

S410: The mobility management network element sends a first message to the service communication proxy network element. Accordingly, the service communication proxy network element receives the first message.

Herein, after receiving a request, sent by a UE, for establishing a session, the mobility management network element determines that the session uses the home routed mode, that is, the session needs to include an H-SMF and a V-SMF. For example, the mobility management network element may determine, based on subscription information of the UE or other information, that the session uses the home routed mode. For a process of determining, by the mobility management network element, that the session uses the home routed mode, refer to descriptions in other approaches. For brevity, details are not described herein.

Herein, for an explanation of the first message, refer to the description of the first message in the method 200. For brevity, details are not described herein again.

If the session does not use the home routed mode, when the mobility management network element cannot determine whether an I-SMF needs to be selected, the mobility management network element may first send the first message to the service communication proxy network element, to select an SMF.

S420: The service communication proxy network element obtains the first parameter information based on the first message, where the first message is used to request the service communication proxy network element to discover an H-SMF based on the first parameter information, where the first parameter information includes a home public land mobile network (HPLMN) ID and a data network name (DNN), and where the HPLMN ID is a PLMN ID of a PLMN in which the H-SMF is located.

If the session does not use the home routed mode, the first parameter information does not include the HPLMN ID, and the first parameter information includes a parameter, other than UE location information, that is used for selecting an SMF. Thus, the service communication proxy network element discovers the SMF based on the first parameter information.

Optionally, the first message may be a first request message, and the first parameter information may be carried in a header or a message body of the first request message. This is not limited.

S430: The service communication proxy network element selects one or more H-SMFs that satisfy the first parameter information, and sends a first response message to the mobility management network element, where the first response message includes information about the one or more H-SMFs.

In other words, if the service communication proxy network element discovers the one or more H-SMFs that satisfy the HPLMN ID and the DNN, or discovers one or more SMFs that satisfy the DNN, the service communication proxy network element may send the information about the discovered one or more H-SMFs or information about the discovered one or more SMFs to the mobility management network element.

Herein, the service communication proxy network element may perform step S430 based on target network element type indication information or first indication information.

Optionally, the first parameter information may further include first target network element type indication information. If the first target network element indication information is used to indicate the service communication proxy network element to select an H-SMF or an SMF, the service communication proxy network element selects the one or more H-SMFs that support the HPLMN ID and the DNN or selects the one or more SMFs that support the DNN, and sends the information about the one or more H-SMFs or the information about the one or more SMFs to the mobility management network element.

Optionally, the service communication proxy network element receives the first indication information from the mobility management network element, where the first indication information is used to indicate the service communication proxy network element to return, after the service communication proxy network element discovers an H-SMF or an SMF, a response message to the mobility management network element. If the service communication proxy network element receives the first indication information, the service communication proxy network element sends the first response message to the mobility management network element when the service communication proxy network element discovers the one or more H-SMFs that satisfy both the HPLMN ID and the DNN or the one or more SMFs that support the DNN. In other words, the service communication proxy network element sends the information about the one or more H-SMFs or the information about the one or more SMFs to the mobility management network element. Optionally, the first indication information is further used to indicate the service communication proxy network element not to send the first request message to the selected H-SMF or SMF. Optionally, the first indication information may be home routed indication information.

Optionally, the first indication information may be carried in the first parameter information.

Therefore, in the home routed mode, the service communication proxy network element sends, to the mobility management network element, the information about the one or more H-SMFs that support the HPLMN ID and the DNN, such that the mobility management network element may obtain the information about the H-SMF, to perform a subsequent operation. For example, the mobility management network element may send the received information about the H-SMF to the V-SMF. In the non-home-routed mode, the service communication proxy network element sends the information about the one or more SMFs that support the DNN to the mobility management network element, such that the mobility management network element may obtain the information about the SMF, to perform a subsequent operation. For example, the mobility management network element may determine, based on the received information about the SMF, whether an I-SMF needs to be selected.

Optionally, the method 400 further includes the following steps.

S440: The mobility management network element sends a second message to the service communication proxy network element. The service communication proxy network element receives the second message from the mobility management network element.

S450: The service communication proxy network element obtains second parameter information based on the second message, where the second parameter information includes the UE location information.

Optionally, the second message may be understood as a second request message, and the second parameter information may be carried in a header or a message body of the second request message. This is not limited.

S460: The service communication proxy network element selects a V-SMF or an I-SMF based on the second parameter information.

In other words, the service communication proxy network element selects, based on the second parameter information, a V-SMF that supports the UE location information. The service communication proxy network element may query an NRF to obtain a V-SMF or an I-SMF that satisfies the second parameter information.

Optionally, the second parameter information further includes second target network element type indication information, and the second target network element type indication information is used to indicate the service communication proxy network element to select a V-SMF or an I-SMF. If the service communication proxy network element obtains the second target network element type indication information, when the service communication proxy network element selects an SMF that supports the UE location information, the service communication proxy network element selects a V-SMF or an I-SMF whose network element type conforms to a network element type indicated by the second target network element type indication information. In other words, the service communication proxy network element selects a V-SMF or an I-SMF that supports the UE location information. Optionally, the service communication proxy network element determines, based on the second target network element type indication information, that the second request message needs to be sent to the selected V-SMF or I-SMF.

S470: The service communication proxy network element obtains the second request message based on the second message, and sends the second request message to the V-SMF or the I-SMF.

If the service communication proxy network element discovers the V-SMF or the I-SMF that supports the UE location information, the service communication proxy network element sends the second request message to the selected V-SMF or I-SMF. For example, in the second request message that is sent by the mobility management network element, the service communication proxy network element needs to change a host name to an address or an FQDN corresponding to the selected V-SMF or I-SMF.

Optionally, after receiving the second request message, the V-SMF or the I-SMF may perform an operation related to the second request message. For example, if the second request message is used to establish a session, the V-SMF or the I-SMF establishes a session resource for the second request message. If the second request message includes information about a specified SMF, the V-SMF or the I-SMF may further interact with the specified SMF (for example, an H-SMF), to establish the session on the specified SMF. Herein, for a process of processing a session between the V-SMF or the I-SMF and the specified SMF, refer to descriptions in other approaches. For brevity, details are not described herein.

Optionally, after performing the operation related to the second request message, the V-SMF or the I-SMF may send, to the mobility management network element, an execution success message (for example, a session establishment success message), namely, a response message. Optionally, in a delegated discovery mode, the V-SMF or the I-SMF may first send the response message to the service communication proxy network element, such that the service communication proxy network element forwards the response message to the mobility management network element. Optionally, the V-SMF or the I-SMF may add information about the V-SMF or the I-SMF to the response message. Optionally, the service communication proxy network element may add information about the V-SMF or the I-SMF to the response message, and then forward, to the mobility management network element, the response message that includes the information about the V-SMF or the I-SMF. Optionally, the information about the V-SMF or the I-SMF may be carried in a header or a message body of the response message. This is not limited in this embodiment of this application.

Optionally, the method 400 further includes: The service communication proxy network element sends the information about the V-SMF or the I-SMF to the mobility management network element.

For example, after receiving the response message of the V-SMF or the I-SMF, the service communication proxy network element may add the information about V-SMF or the I-SMF to the response message. Additionally, the service communication proxy network element may send, to the mobility management network element, the response message that includes the information about the V-SMF or the I-SMF.

Optionally, the information about the V-SMF or the I-SMF includes at least service area information of the V-SMF or the I-SMF, such that after the UE moves, the mobility management network element determines, based on the service area information of the V-SMF or the I-SMF and the UE location information, whether to reselect a V-SMF or an I-SMF. Optionally, the information about the V-SMF or the I-SMF may further include identification information of the V-SMF or the I-SMF, for example, an I-SMF instance identifier.

Optionally, the mobility management network element may further send the identification information of the V-SMF or the I-SMF to a target mobility management network element. As such, the target mobility management network element obtains the service area information of the V-SMF or the I-SMF based on the identification information of the V-SMF or the I-SMF, and the target mobility management network element determines whether to select a new V-SMF or I-SMF to replace the existing V-SMF or I-SMF. Optionally, after obtaining the service area information of the V-SMF or the I-SMF, the mobility management network element may send the service area information of the V-SMF or the I-SMF to a target mobility management network element, such that the target mobility management network element determines, based on the service area information of the V-SMF or the I-SMF, whether to select a new SMF to replace the existing V-SMF or I-SMF.

Figure 7:
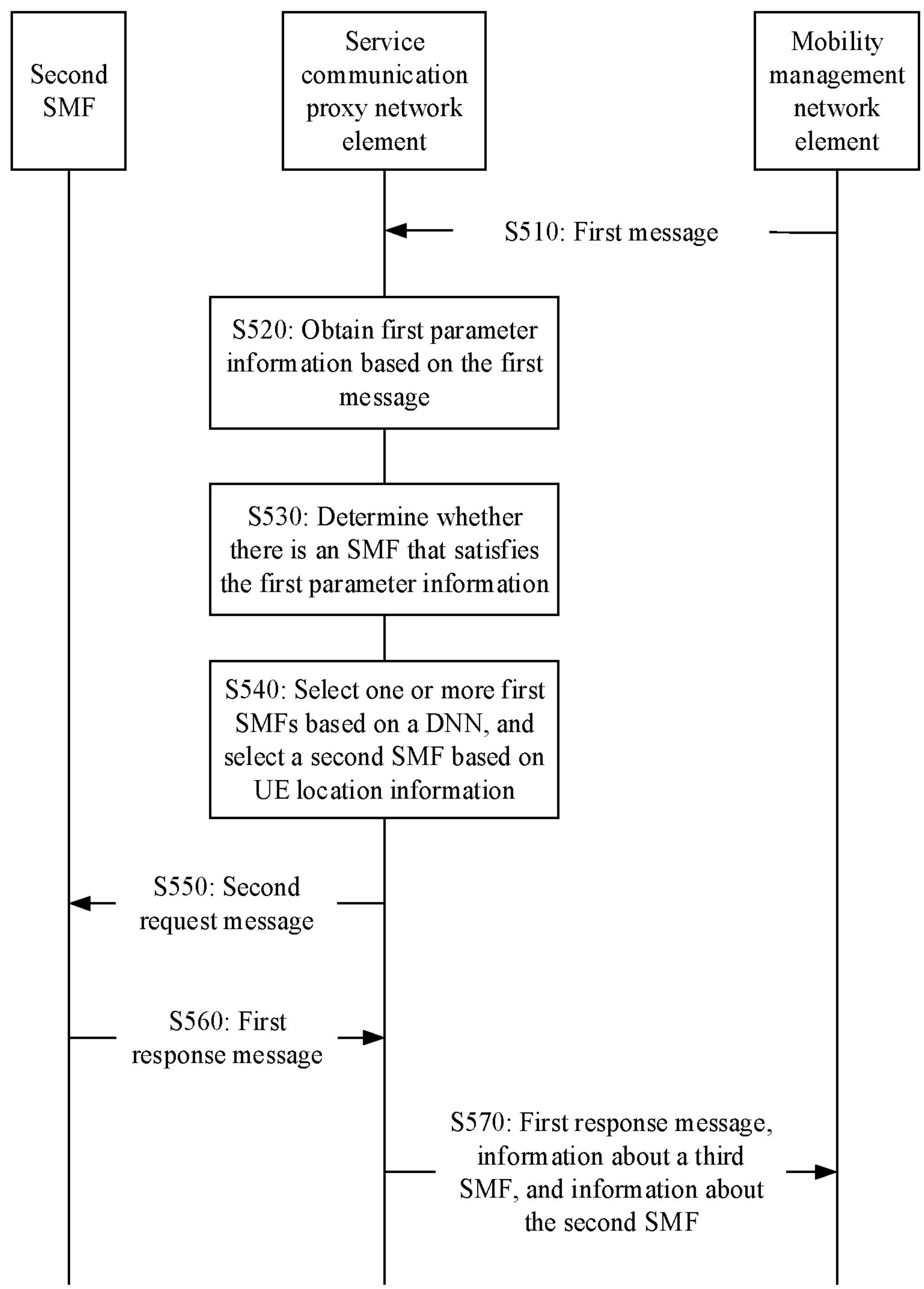
FIG. 7 is a schematic interaction diagram of a method for selecting a session management network element according to yet still another embodiment of this application.

This application further provides yet another method for selecting an SMF. FIG. 7 is a schematic interaction diagram of a method 500 for selecting an SMF according to yet another embodiment of this application. In the method 500, a service communication proxy network element may select a first SMF and a second SMF. The method 500 supports a scenario in which the service communication proxy network element may select both an H-SMF and a V-SM in a home routed mode. A method on a service communication proxy network element side may be performed by a proxy network element (for example, an SCP) or a chip (or a module) in a service communication proxy network element, and a method on a mobility management network element side may be performed by a mobility management network element (for example, an AMF) or a chip (or a module) in a mobility management network element. As shown in FIG. 7, the method 500 includes the following steps.

S510: The mobility management network element sends a first message to the service communication proxy network element. Accordingly, the service communication proxy network element receives the first message.

S520: The service communication proxy network element obtains first parameter information based on the first message, where the first parameter information includes UE location information and a DNN.

Optionally, the first message includes a first request message, and the first parameter information is carried in a header or a message body of the first request message. This is not limited.

Herein, a logical relationship between the UE location information and the DNN is determined by the service communication proxy network element, but not specified by the mobility management network element. Optionally, the service communication proxy network element may set the UE location information to be optional, select one or more SMFs that support the DNN, and then determine whether the selected one or more SMFs support the UE location information. If there is no SMF that supports the UE location information in the one or more SMFs, the service communication proxy network element selects a second SMF. Optionally, the service communication proxy network element may generate a specific logical expression based on the UE location information and the DNN, to select, according to the logical expression, one or more SMFs that satisfy both the UE location information and the DNN. Alternatively, when there is no SMF that satisfies both the UE location information and the DNN, the service communication proxy network element selects one or more SMFs that satisfy the DNN and a second SMF that supports the UE location information.

S530: The service communication proxy network element determines whether there is an SMF that satisfies the first parameter information.

Herein, the service communication proxy network element may determine whether there is an SMF that satisfies both the UE location information and the DNN.

S540: When there is no SMF that satisfies the first parameter information, the service communication proxy network element selects one or more first SMFs based on the DNN, and selects the second SMF based on the UE location information.

In other words, if there is no SMF that satisfies both the UE location information and the DNN, the service communication proxy network element selects the one or more first SMFs that support the DNN, and selects the second SMF that supports the UE location information.

Optionally, the first SMF is an SMF, and the second SMF is an I-SMF. Alternatively, the first SMF is an H-SMF, and the second SMF is a V-SMF.

Therefore, in this embodiment of this application, the service communication proxy network element may determine whether two SMFs need to be selected for a session. In this way, when working in a delegated discovery mode, the mobility management network element still supports establishment of a session including two SMFs, such that an application scenario in which the mobility management network element works in the delegated discovery mode is not limited.

Optionally, the method 500 further includes the following step: the service communication proxy network element generates a second request message based on the first message and information about the one or more first SMFs, where the second request message includes information about one or more fourth SMFs in the selected one or more first SMFs.

Herein, the service communication proxy network element may fill, in the first request message, the information about the one or more fourth SMFs, to generate the second request message. In other words, the service communication proxy network element needs to modify the message body of the first request message that is sent by the mobility management network element. For example, when the first request message that is sent by the mobility management network element is an Nsmf_PDUSession_CreateSMContext request, the service communication proxy network element inserts the information about the one or more fourth SMFs into the message body of the message, such that the second SMF may select, based on the information about the one or more fourth SMFs, a fifth SMF to send a message, to complete session establishment.

Optionally, the service communication proxy network element may not modify the message body of the first request message, but add the information about the one or more fourth SMFs to the message header of the first request message, to obtain the second request message. In other words, a message header of the second request message carries the information about the one or more fourth SMFs. In this way, when processing a session, the second SMF needs to additionally read the message header of the second request message, to obtain information about the fifth SMF (where the fifth SMF is an SMF of the one or more fourth SMFs).

S550: The service communication proxy network element sends the second request message to the second SMF. The second request message includes the information about the one or more fourth SMFs.

Herein, if the service communication proxy network element discovers one or more first SMFs the one or more first SMF that supports the DNN, the service communication proxy network element may select the one or more fourth SMFs from the one or more first SMFs, and send the information about the one or more fourth SMFs to the second SMF, such that the second SMF selects one of the one or more fourth SMFs to provide a service for the session.

S560: The second SMF sends a first response message to the service communication proxy network element. Accordingly, the service communication proxy network element receives the first response message from the second SMF.

Optionally, after performing an operation related to the second request message, the second SMF may send, to the mobility management network element, an execution success message (for example, a session establishment success message), namely, the first response message. Optionally, in the delegated discovery mode, the second SMF may first send the first response message to the service communication proxy network element, such that the service communication proxy network element forwards the first response message to the mobility management network element. The service communication proxy network element may obtain the information about the fifth SMF from the first response message. The fifth SMF is an SMF that is selected by the second SMF based on the information about the one or more fourth SMFs in the second request message and that provides a service for the session.

Optionally, the first response message includes uniform resource identifier (URI) information of the fifth SMF. The service communication proxy network element may obtain address information (for example, an IP address or a fully qualified domain name (FQDN) of the fifth SMF based on the URI information of the fifth SMF. Then, the service communication proxy network element determines an SMF corresponding to the session based on the address information of the fifth SMF. For example, the service communication proxy network element compares the address information that is of the fifth SMF and that is obtained from the first response message with address information of an SMF in one or more configuration files of the one or more first SMFs that are selected based on the DNN in step S540. If the address information of the fifth SMF matches the address information of the SMF in the configuration file, the SMF described in the SMF configuration file is the SMF corresponding to the session. The SCP sends service area information of the fifth SMF in the configuration file to an AMF.

S570: The service communication proxy network element sends the first response message, the information about the fifth SMF, and the information about the second SMF to the mobility management network element, where the fifth SMF is an SMF in the one or more first SMFs. Optionally, the information about the fifth SMF and the information about the second SMF may be carried in a header or a message body of the response message. This is not limited in this embodiment.

Optionally, the information about the second SMF includes at least service area information of the second SMF. Optionally, the information about the second SMF may further include identification information of the second SMF, for example, an I-SMF instance identifier.

Optionally, the information about the fifth SMF includes at least the service area information of the fifth SMF. Optionally, the information about the fifth SMF may further include identification information of the fifth SMF, for example, an SMF instance identifier.

Optionally, the first response message includes the URI information of the fifth SMF, and the URI information of the fifth SMF is used by the mobility management network element to determine the information about the fifth SMF. For example, the mobility management network element may obtain the service area information of the fifth SMF based on the URI information.

For example, the mobility management network element may send a request message to the service communication proxy network element, and send the URI information of the fifth SMF or the address information in the URI information of the fifth SMF to the service communication proxy network element, such that the service communication proxy network element may obtain a configuration file of the fifth SMF or the service area information of the fifth SMF based on the address information in the URI information of the fifth SMF. Accordingly, the service communication proxy network element needs to provide a service-based interface, such that the mobility management network element invokes the service-based interface to obtain the service area information of the fifth SMF. Alternatively, the mobility management network element may obtain the configuration file of the fifth SMF from an NRF based on the address information in the URI information of the fifth SMF. Accordingly, the NRF needs to support a capability of querying an SMF based on an URI of the SMF.

In the embodiments of this application, unless otherwise stated or there is a logic conflict, terms and/or descriptions between different embodiments are consistent and may be mutually referenced, and technical features in different embodiments may be combined according to an internal logical relationship thereof, to form a new embodiment.

Figure 8:
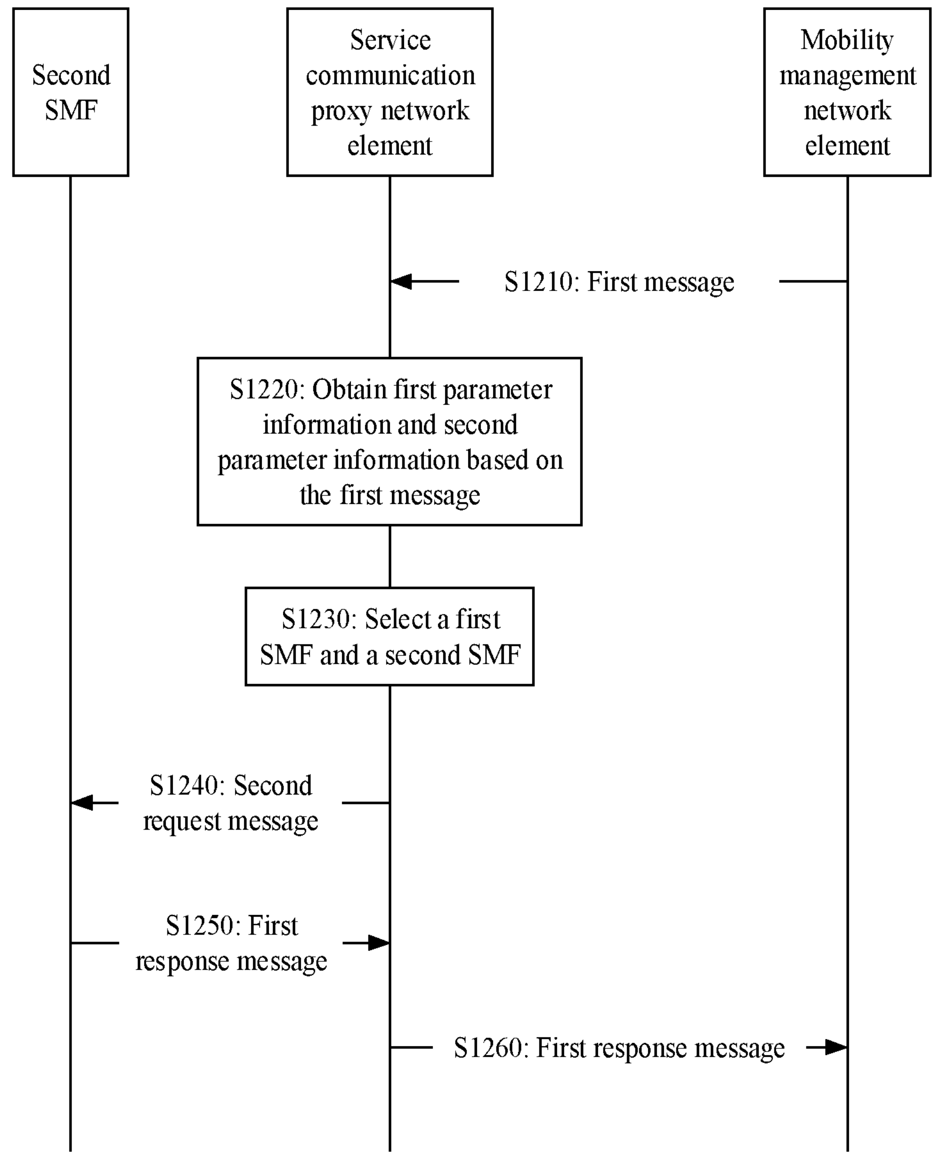
FIG. 8 is a schematic interaction diagram of a method for selecting a session management network element according to a further embodiment of this application.

This application further provides still yet another method for selecting an SMF. FIG. 8 is a schematic interaction diagram of a method 1200 for selecting an SMF according to yet still another embodiment of this application. In the method 1200, a service communication proxy network element may directly select a first SMF and a second SMF based on parameters specified by a mobility management network element. When this embodiment corresponds to a home routed mode, the first SMF is an H-SMF, and the second SMF is a V-SMF. A method on a service communication proxy network element side may be performed by the service communication proxy network (for example, an SCP) or a chip (or a module) in the service communication proxy network element, and a method on a mobility management network element side may be performed by the mobility management network element (for example, an AMF) or a chip (or a module) in the mobility management network element. As shown in FIG. 8, the method 1200 includes the following steps.

S1210: The mobility management network element sends a first message to the service communication proxy network element. Accordingly, the service communication proxy network element receives the first message.

S1220: The service communication proxy network element obtains first parameter information and second parameter information based on the first message.

In this embodiment of this application, the mobility management network element classifies a parameter for selecting the first SMF and a parameter for selecting the second SMF in the first message, such that the SCP can directly select the first SMF based on the parameter for selecting the first SMF, and directly select the second SMF based on the parameter for selecting the second SMF. For example, the first parameter information is used to select the first SMF, and the second parameter information is used to select the second SMF. The service communication proxy network element may directly select the first SMF and the second SMF based on the two parameters. In this way, the service communication proxy network element does not need to have determining logic in the method 500 to determine whether there is an SMF that satisfies all parameters. If there is no such SMF that satisfies all the parameters, the service communication proxy network element selects the first SMF and the second SMF. This simplifies logic of the service communication proxy, such that the service communication proxy does not need to understand service-related logic.

In this embodiment, the mobility management network element specifies that the service communication proxy network element selects the first SMF and the second SMF, and specifies the parameter for selecting the first SMF and the parameter for selecting the second SMF.

In a home routed scenario, the first SMF is an H-SMF, and the first parameter information includes information such as a network element type indication, an HPLMN ID, and a DNN; and the second SMF is a V-SMF, and the second parameter information includes information such as a network element type indication, and (optional) UE location information.

If the first SMF is an SMF, the first parameter information includes information such as a network element type indication and a DNN. If the second SMF is an I-SMF, the second parameter information includes information such as a network element type indication and UE location information.

Further, optionally, the mobility management network element indicates a specific group of parameters for selecting the second SMF (that is, a target SMF to which the service communication proxy network element sends a second request message) or a specific group of parameters for selecting the first SMF. In this way, the service communication proxy network element may add the selected first SMF to a first request message based on the indication, to generate the second request message, and send the second request message to the second SMF.

Optionally, in an implementation, the mobility management network element may indicate, based on a network element type indication, a specific group of parameters for selecting the second SMF or a specific group of parameters for selecting the first SMF. For example, in the home routed scenario, when the network element type indication indicates the service communication proxy network element to select a V-SMF or an I-SMF, the group of parameters are used to select the second SMF. Alternatively, when the network element type indicates the service communication proxy network element to select an H-SMF or an SMF, the group of parameters are used to select the first SMF.

It should be noted that, optionally, before requesting the service communication proxy network element to select the first SMF and the second SMF, the mobility management network element determines whether the second SMF needs to be selected. In an implementation, before this procedure is triggered, the mobility management network element first requests the service communication proxy network element to select an SMF that supports both the UE location information and the DNN. If there is no SMF that supports both the UE location information and the DNN, the mobility management network element determines that the first SMF and the second SMF need to be selected. For example, the mobility management network element sends a message X to the service communication proxy network element, where the message X includes a parameter Y. The parameter Y includes a network element type (an SMF), the UE location information, and the DNN. If the SCP determines that there is no SMF that supports both the UE location information and the DNN, the SCP sends a reject message to the mobility management network element, to notify the mobility management network element that the SCP fails to select an SMF that supports both the UE location information and the DNN.

S1230: The service communication proxy network element selects the first SMF and the second SMF.

Herein, the service communication proxy network element directly selects one or more first SMFs based on the first parameter information, and selects the second SMF based on the second parameter information.

Optionally, the method 1200 further includes the following step: the service communication proxy network element generates a second request message based on the first message and information about the one or more first SMFs, where the second request message includes information about one or more fourth SMFs in the selected one or more first SMFs.

Herein, the service communication proxy network element may fill, in the first request message, the information about the one or more fourth SMFs in the one or more first SMFs, to generate the second request message. In other words, the service communication proxy network element needs to modify a message body of the first request message that is sent by the mobility management network element. For example, when the first request message that is sent by the mobility management network element is an Nsmf_PDUSession_CreateSMContext request, the service communication proxy network element inserts the information about the one or more fourth SMFs in the one or more first SMFs into a message body of the message, such that the second SMF may select, based on the information about the one or more fourth SMFs in the one or more first SMFs, a fifth SMF from the one or more fourth SMFs to send a message, to complete session establishment.

Optionally, the service communication proxy network element may not modify the message body of the first request message, but add the information about the one or more fourth SMFs in the one or more first SMFs to a message header of the first request message, to obtain the second request message. In other words, a message header of the second request message carries the information about the one or more fourth SMFs in the one or more first SMFs. In this way, when processing a session, the second SMF needs to additionally read the message header of the second request message, to obtain information about the fifth SMF (where the fifth SMF is an SMF in the one or more fourth SMFs in the one or more first SMFs).

S1240: The service communication proxy network element sends the second request message to the second SMF. The second request message includes the information about the one or more fourth SMFs in the one or more first SMFs.

Herein, the second SMF may select one fourth SMF in the one or more fourth SMFs in the one or more first SMFs to provide a service for the session.

S1250: The second SMF sends a first response message to the service communication proxy network element. Accordingly, the service communication proxy network element receives the first response message from the second SMF.

Optionally, after performing an operation related to the second request message, the second SMF may send, to the mobility management network element, an execution success message (for example, a session establishment success message), namely, the first response message.

In an implementation, the second SMF sends the first response message including information about the second SMF to the mobility management network element. The first response message further includes the information about the fifth SMF.

Optionally, the information about the second SMF includes service area information of the second SMF. Optionally, the information about the second SMF may further include identification information of the second SMF, for example, an I-SMF instance identifier.

Optionally, the information about the fifth SMF includes service area information of the fifth SMF. Optionally, the information about the fifth SMF may further include identification information of the fifth SMF, for example, an SMF instance identifier.

If the information about the second SMF and the information about the fifth SMF each are an identifier (for example, an instance identifier or URI information) of the corresponding SMF, the mobility management network element may obtain service area information of the SMF based on identification information of the SMF.

In another implementation, after receiving the first response message, the service communication proxy network element sends the area information of the second SMF and the area information of the fifth SMF to the mobility management network element. The service communication proxy network element may obtain address information (for example, an IP address or a fully qualified domain name (FQDN) of the fifth SMF based on URI information of the fifth SMF in the first response message. Then, the service communication proxy network element determines an SMF corresponding to the session based on the address information of the fifth SMF. For example, the service communication proxy network element compares the address information that is of the fifth SMF and that is obtained from the first response message with address information of an SMF in a configuration file of the one or more first SMFs that are selected based on the DNN in step S540. If the address information of the fifth SMF matches the address information of the SMF in the configuration file, the SMF described in the SMF configuration file is the SMF corresponding to the session. The SCP sends the service area information of the fifth SMF in the configuration file to an AMF.

Alternatively, in another implementation, after receiving the first response message, the service communication proxy network element sends the information about the second SMF to the mobility management network element. The second SMF adds the information about the fifth SMF to the first response message. The information about the second SMF and the information about the fifth SMF each may be an identifier of the corresponding SMF, and the mobility management network element may obtain service area information of the SMF based on identification information of the SMF.

S1260: The service communication proxy network element sends the first response message to the mobility management network element.

Optionally, the service communication proxy network element may send the information about the second SMF and the information about the fifth SMF to the mobility management network element.

Optionally, the information about the second SMF includes service area information of the second SMF. Optionally, the information about the second SMF may further include identification information of the second SMF, for example, an I-SMF instance identifier.

Optionally, the information about the fifth SMF includes service area information of the fifth SMF. Optionally, the information about the fifth SMF may further include identification information of the fifth SMF, for example, an SMF instance identifier.

Optionally, the first SMF is an SMF, and the second SMF is an I-SMF. Alternatively, the first SMF is an H-SMF, and the second SMF is a V-SMF.

The foregoing describes the method for selecting an SMF, and the following describes an apparatus for selecting an SMF according to the embodiments of this application. It should be understood that the technical features described in the method embodiments are also applicable to the following apparatus embodiments.

Figure 9:
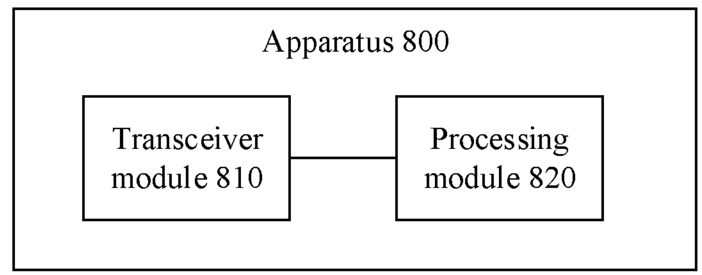
FIG. 9 is a possible example block diagram of an apparatus according to an embodiment of this application.

FIG. 9 is a possible example block diagram of an apparatus 800 according to an embodiment of this application. The apparatus 800 may exist in a form of software, or may be a service communication proxy network element, or may be a chip in a service communication proxy network element. The apparatus 800 includes a transceiver module 810 and a processing module 820. The transceiver module 810 may include a receiving unit and a sending unit. The processing module 820 is configured to control and manage an action of the apparatus 800. The transceiver module 810 is configured to support communication between the apparatus 800 and another network entity (for example, a session control function entity). Optionally, the apparatus 800 may further include a storage unit, and the storage unit is configured to store program code and data of the apparatus 800.

Optionally, the modules in the apparatus 800 may be implemented by software.

Optionally, the processing module 820 may be a processor or a controller. For example, the processing module 820 may be a general-purpose central processing unit (CPU), a general-purpose processor, a digital signal processor (DSP), an application-specific integrated circuit (ASIC), a field-programmable gate array (FPGA), another programmable logic device, a transistor logic device, a hardware component, or any combination thereof. The processing module 820 may implement or execute various example logical blocks, modules, and circuits described with reference to content disclosed in the embodiments of this application. The processor may be a combination of processors implementing a computing function, for example, a combination of one or more microprocessors, or a combination of a DSP and a microprocessor. The transceiver module 810 may be a communications interface, a transceiver, a transceiver circuit, or the like. The communications interface is an umbrella term. In an implementation, the communications interface may include a plurality of interfaces. For example, the communications interface may include an interface between a service communication proxy network element and a call session control function (CSCF) network element, and/or another interface. The storage unit may be a memory.

The processing module 820 can support the apparatus 800 in performing actions of the service communication proxy network element in the foregoing method examples. For example, the processing module 820 can support the apparatus 800 in performing steps 220 and 230 in FIG. 2, steps 260 and 270 in FIG. 3, steps 320 and 330 in FIG. 4, steps 320, 330, 380, and 390 in FIG. 5, steps 420, 450, and 460 in FIG. 6, and steps 520, 530, and 540 in FIG. 7.

The transceiver module 810 can support communication between the apparatus 800, a mobility management network element, and an SMF (for example, a V-SMF or an I-SMF). For example, the transceiver module 810 can support the apparatus 800 in performing steps 210 and 240 in FIG. 2, and steps 250 and 280 in FIG. 3, steps 310, 340, 350, and 360 in FIG. 4, steps 370, 391, and 392 in FIG. 5, and steps 410, 430, 440, and 470 in FIG. 6. For example, details may be provided as follows.

In a first implementation, the apparatus 800 includes: the transceiver module 810 configured to receive a first message from a mobility management network element; and the processing module 820 configured to obtain first parameter information based on the first message, where the first message is used to request the service communication proxy network element to select an SMF based on the first parameter information, and where the first parameter information includes UE location information and a DNN. Additionally, the processing module 820 is further configured to: determine whether there is an SMF that satisfies the first parameter information; and when there is no SMF that satisfies the first parameter information, select one or more first SMFs that support the DNN and invoke the transceiver module 810 to send a reject message to the mobility management network element, where the reject message includes information about the one or more first SMFs.

In a possible implementation, the transceiver module 810 is further configured to: receive a second message from the mobility management network element. The processing module 820 is further configured to: obtain second parameter information based on the second message, where the second parameter information includes the UE location information; select a second SMF based on the second parameter information; obtain a second request message based on the second message; and invoke the transceiver module 810 to send the second request message to the second SMF.

In a possible implementation, the transceiver module 810 is further configured to send information about the second SMF to the mobility management network element.

In a possible implementation, that the processing module 820 is configured such that when there is no SMF that satisfies the first parameter information, the processing module 820 selects one or more first SMFs that support the DNN and invokes the transceiver module 810 to send a reject message to the mobility management network element includes: the first parameter information further includes target network element type indication information; and if the target network element type indication information is used to indicate the service communication proxy network element to select an SMF, when the processing module 820 determines that there is no SMF that satisfies the first parameter information, the processing module 820 selects one or more first SMFs that support the DNN and invokes the transceiver module 810 to send the information about the one or more first SMFs to the mobility management network element.

In a possible implementation, the transceiver module 810 is further configured to: receive first indication information from the mobility management network element, where the first indication information is used to indicate the apparatus 800 to select, when the apparatus 800 determines that there is no SMF that satisfies the first parameter information, the one or more first SMFs that support the DNN; and send the information about the one or more first SMFs to the mobility management network element.

Optionally, the second request message includes the information about the one or more first SMFs.

Optionally, the second SMF is a visited session management function (V-SMF), and the first SMF is an H-SMF. The first parameter information further includes a home public land mobile network (HPLMN) ID. The first parameter information is used to discover a home session management function (H-SMF). The reject message includes information about one or more H-SMFs.

In a possible implementation, that the processing module 820 is configured to select one or more first SMFs that support the DNN when there is no SMF that satisfies the first parameter information includes: when there is no SMF that satisfies the first parameter information, selecting one or more H-SMFs that support the HPLMN ID and the DNN.

Optionally, the second SMF is an intermediate session management function (I-SMF).

It should be understood that the apparatus 800 according to this embodiment of this application may correspond to the method performed by the service communication proxy network element in the foregoing method embodiment, for example, the method of FIG. 2 or FIG. 3. In addition, the foregoing and other management operations and/or functions of the modules in the apparatus 800 are used to implement corresponding steps of the method performed by the service communication proxy network element in the foregoing method embodiment. Therefore, beneficial effects of the foregoing method embodiment can also be achieved. For brevity, details are not described herein again.

In a second implementation, the apparatus 800 includes: the transceiver module 810 configured to receive a first message from a mobility management network element. Additionally, the processing module 820 is configured to: obtain first parameter information based on the first message, where the first message is used to request the service communication proxy network element to select an SMF based on the first parameter information; obtain a first request message based on the first message; send the first request message to the SMF, where the first parameter information includes UE location information and a DNN; determine whether there is an SMF that satisfies the first parameter information; and when there is no SMF that satisfies the first parameter information, invoke the transceiver module 810 to send a reject message to the mobility management network element, where the reject message is used to indicate that there is no SMF that satisfies the first parameter information. The transceiver module 810 is further configured to receive second parameter information from the mobility management network element, where the second parameter information includes the DNN. The processing module 820 is further configured to: select one or more first SMFs that support the second parameter information; and invoke the transceiver module 810 to send a first response message to the mobility management network element, where the first response message includes information about the one or more first SMFs.

In a possible implementation, the transceiver module 810 is further configured to receive a second message from the mobility management network element. Additionally, the processing module 820 is further configured to: obtain third parameter information based on the second message, where the third parameter information includes the UE location information; select a second SMF based on the third parameter information; obtain a second request message based on the second message; and invoke the transceiver module 810 to send the second request message to the second SMF.

In a possible implementation, the transceiver module 810 is further configured to send information about the second SMF to the mobility management network element.

In a possible implementation, that the processing module 820 is configured to select one or more first SMFs that support the second parameter information, and send a first response message to the mobility management network element includes: the second parameter information further includes first indication information, and the first indication information is used to indicate the service communication proxy network element to select the one or more SMFs that support the DNN, and send the first response message to the mobility management network element.

In a possible implementation, that the processing module 820 is configured to select one or more first SMFs that support the DNN and invoke the transceiver module 810 to send a first response message to the mobility management network element includes: the second parameter information further includes first target network element type indication information, and if the first target network element type indication information is used to indicate an SMF, the processing module 820 selects the one or more first SMFs that support the DNN, and sends the first response message to the mobility management network element.

Optionally, that the processing module 820 selects the second SMF based on the third parameter information includes: the third parameter information further includes second target network element type indication information, and the second target network element type indication information is used to indicate an intermediate SMF.

Optionally, the second SMF is an intermediate session management function (I-SMF).

It should be understood that the apparatus 800 according to this embodiment of this application may correspond to the method performed by the service communication proxy network element in the foregoing method embodiment, for example, the method of FIG. 4 or FIG. 5. In addition, the foregoing and other management operations and/or functions of the modules in the apparatus 800 are used to implement corresponding steps of the method performed by the service communication proxy network element in the foregoing method embodiment. Therefore, beneficial effects of the foregoing method embodiment can also be achieved. For brevity, details are not described herein again.

In a third implementation, the apparatus 800 includes: the transceiver module 810 configured to receive a first message from a mobility management network element; and the processing module 820 configured to obtain first parameter information based on the first message, where the first message is used to request the apparatus 800 to discover an H-SMF based on the first parameter information, and where the first parameter information includes a home public land mobile network (HPLMN) ID and a DNN. The processing module 820 is further configured to: select one or more H-SMFs that satisfy the first parameter information; and invoke the transceiver module 810 to send a first response message to the mobility management network element, where the first response message includes information about the one or more H-SMFs.

In a possible implementation, the transceiver module 810 is further configured to receive a second message from the mobility management network element. The processing module 820 is further configured to: obtain second parameter information based on the second message, where the second parameter information includes UE location information; select a V-SMF based on the second parameter information; obtain a second request message based on the second message; and invoke the transceiver module 810 to send the second request message to the V-SMF.

In a possible implementation, the transceiver module 810 is further configured to send information about the V-SMF to the mobility management network element.

In a possible implementation, the transceiver module 810 is further configured to receive first indication information from the mobility management network element, where the first parameter information further includes the first indication information, and where the first indication information is used to indicate the service communication proxy network element to return, after the service communication proxy network element discovers an H-SMF, a response message to the mobility management network element.

In a possible implementation, that the processing module 820 is configured to select one or more H-SMFs that satisfy the first parameter information, and invoke the transceiver module 810 to send a first response message to the mobility management network element includes: the first parameter information further includes first target network element type indication information, and if the first target network element type indication information is used to indicate an H-SMF or an SMF, selecting one or more H-SMFs that support the HPLMN ID and the DNN, and invoking the transceiver module 810 to send the first response message to the mobility management network element.

In a possible implementation, that the processing module 820 is configured to select, based on the second parameter information, a V-SMF that supports the UE location information includes: the second parameter information further includes second target network element type indication information, and the second target network element type indication information is used to indicate the service communication proxy network element to select the V-SMF.

It should be understood that the apparatus 800 according to this embodiment of this application may correspond to the method performed by the service communication proxy network element in the foregoing method embodiment, for example, the method of FIG. 6. In addition, the foregoing and other management operations and/or functions of the modules in the apparatus 800 are used to implement corresponding steps of the method performed by the service communication proxy network element in the foregoing method embodiment. Therefore, beneficial effects of the foregoing method embodiment can also be achieved. For brevity, details are not described herein again.

In a fourth implementation, the apparatus 800 includes: the transceiver module 810 configured to receive a first message from a mobility management network element; and the processing module 820 configured to obtain first parameter information based on the first message, where the first parameter information includes UE location information and a DNN. The processing module 820 is further configured to: determine whether there is an SMF that satisfies the first parameter information; and when there is no SMF that satisfies the first parameter information, select one or more first SMFs based on the DNN, and select a second SMF based on the UE location information.

In a possible implementation, the processing module 820 is further configured to generate a second request message based on the first message and information about the one or more first SMFs, where the second request message includes information about one or more fourth SMFs. Additionally, the transceiver module 810 is further configured to send a second request message to the second SMF.

In a possible implementation, the transceiver module 810 is further configured to send information about a fifth SMF and information about the second SMF to the mobility management network element, where the fifth SMF is an SMF selected by the second SMF from the one or more fourth SMFs.

In a possible implementation, the transceiver module 810 is further configured to receive a first response message from the second SMF, where the first response message includes URI information of the fifth SMF. Additionally, that the transceiver module 810 is configured to send information about a fifth SMF to the mobility management network element includes: obtaining the information about the fifth SMF based on the URI information of the fifth SMF in the first response message, and sending the information about the fifth SMF to the mobility management network element.

Optionally, the information about the fifth SMF is included in a header or a message body of the second request message.

Optionally, the information about the fifth SMF and the information about the second SMF are included in a header or a message body of the first response message.

Optionally, the first SMF is an SMF, and the second SMF is an I-SMF. Alternatively, the first SMF is an H-SMF, and the second SMF is a V-SMF.

It should be understood that the apparatus 800 according to this embodiment of this application may correspond to the method performed by the service communication proxy network element in the foregoing method embodiment, for example, the method of FIG. 7. In addition, the foregoing and other management operations and/or functions of the modules in the apparatus 800 are used to implement corresponding steps of the method performed by the service communication proxy network element in the foregoing method embodiment. Therefore, beneficial effects of the foregoing method embodiment can also be achieved. For brevity, details are not described herein again.

In a fifth implementation, the apparatus 800 includes: the transceiver module 810 configured to receive a first message from a mobility management network element; and the processing module 820 configured to obtain first parameter information based on the first message, where the first message is used to request the service communication proxy network element to discover a session management network element based on the first parameter information, and the first parameter information includes a data network name DNN; where the processing module 820 is further configured to: select one or more session management network elements that satisfy the first parameter information, and invoke the transceiver module 810 to send a first response message to the mobility management network element, where the first response message includes information about the one or more session management network elements.

In a possible implementation, the transceiver module 810 is further configured to receive a second message from the mobility management network element; and the processing module 820 is further configured to: obtain second parameter information based on the second message, where the second parameter information includes UE location information; select an intermediate session management network element based on the second parameter information; obtain a second request message based on the second message; and send the second request message to the intermediate session management network element.

In a possible implementation, the transceiver module 810 is further configured to send information about the intermediate session management network element to the mobility management network element.

In a possible implementation, the transceiver module 810 is further configured to receive first indication information from the mobility management network element, where the first parameter information further includes the first indication information, and the first indication information is used to indicate the service communication proxy network element to return, after the service communication proxy network element discovers a session management network element, a response message to the mobility management network element.

In a possible implementation, that the processing module 820 is configured to: select one or more session management network elements that satisfy the first parameter information, and invoke the transceiver module 810 to send a first response message to the mobility management network element includes: the first parameter information further includes first target network element type indication information, and if the first target network element type indication information is used to indicate an H-SMF or an SMF, the service communication proxy network element selects one or more H-SMFs or one or more SMFs that support the DNN, and sends the first response message to the mobility management network element.

In a possible implementation, that the transceiver module 810 is configured to select, based on the second parameter information, an intermediate session management network element that supports the UE location information includes: the second parameter information further includes second target network element type indication information, and if the second target network element type indication information is used to instruct the service communication proxy network element to select an I-SMF or a V-SMF, the service communication proxy network element selects an I-SMF or a V-SMF that supports the UE location information.

Optionally, the first parameter information further includes an HPLMN ID.

In a sixth implementation, the apparatus 800 includes the transceiver module 810 configured to receive a first message from a mobility management network element; and the processing module 820 configured to obtain first parameter information and second parameter information based on the first message, where the first parameter information is used to select a first SMF, and the second parameter information is used to select a second SMF. The processing module 820 is further configured to: select one or more first SMFs based on the first parameter information; and select the second SMF based on the second parameter information. In this way, the service communication proxy network element may determine, based on the first parameter information and the second parameter information, that both the first SMF and the second SMF need to be selected. This simplifies logic of the service communication proxy network element, such that the service communication proxy network element does not need to understand service-related logic.

In a possible implementation, the processing module 820 is further configured to generate a second request message based on the first message and information about the one or more first SMFs, where the second request message includes information about one or more fourth SMFs in the one or more first SMFs. The transceiver module 810 is further configured to send the second request message to the second SMF.

In a possible implementation, the first message includes indication information, and the indication information is used to indicate the service communication proxy to add information about the first SMF to the second request message. Alternatively, the indication information is used to indicate the service communication proxy network element to send the second request message to the second SMF.

In a possible implementation, if the indication information is included in the first parameter information, the indication information is a first network element type indication information, and the first network element type indication information is used to indicate to the service communication proxy network element to select an H-SMF or an SMF, where the service communication proxy network element determines that the second request message includes the information about the first SMF. Alternatively, if the indication information is included in the second parameter information, the indication information is a second network element type indication information, and the second network element type indication information is used to indicate to the service communication proxy network element to select a V-SMF or an I-SMF, where the service communication proxy network element determines to send the second request message to the second SMF.

In a possible implementation, the transceiver module 810 is further configured to send information about the fifth SMF and information about the second SMF to the mobility management network element, where the fifth SMF is an SMF selected by the second SMF from the one or more fourth SMFs.

Optionally, the information about the second SMF includes at least one of the following: service area information of a server, identification information, or a URI that are of the second SMF. The information about the fifth SMF includes one or more of the following: service area information of a server, identification information, or a URI that are of the fifth SMF.

Optionally, the information about the fifth SMF and the information about the second SMF are included in a header or a message body of the first response message.

In a possible implementation, the transceiver module 810 is further configured to receive the first response message from the second SMF, where the first response message includes URI information of the fifth SMF. That the transceiver module 810 is configured to send the information about the fifth SMF to the mobility management network element further includes: obtaining the information about the fifth SMF based on the URI information of the fifth SMF in the first response message, and sending the information about the fifth SMF to the mobility management network element.

Optionally, that the service communication proxy network element generates a second request message based on the first message and information about the one or more first SMFs, where the second request message includes information about one or more fourth SMFs in the one or more first SMFs further includes: the information about the one or more fourth SMFs is included in a header or a message body of the second request message.

Optionally, the first SMF is an SMF, and the second SMF is an I-SMF. Alternatively, the first SMF is an H-SMF, and the second SMF is a V-SMF.

It should be understood that the apparatus 800 according to this embodiment of this application may correspond to the method performed by the service communication proxy network element in the foregoing method embodiment, for example, the method of FIG. 8. In addition, the foregoing and other management operations and/or functions of the modules in the apparatus 800 are used to implement corresponding steps of the method performed by the service communication proxy network element in the foregoing method embodiment. Therefore, beneficial effects of the foregoing method embodiment can also be achieved. For brevity, details are not described herein again.

Figure 10:
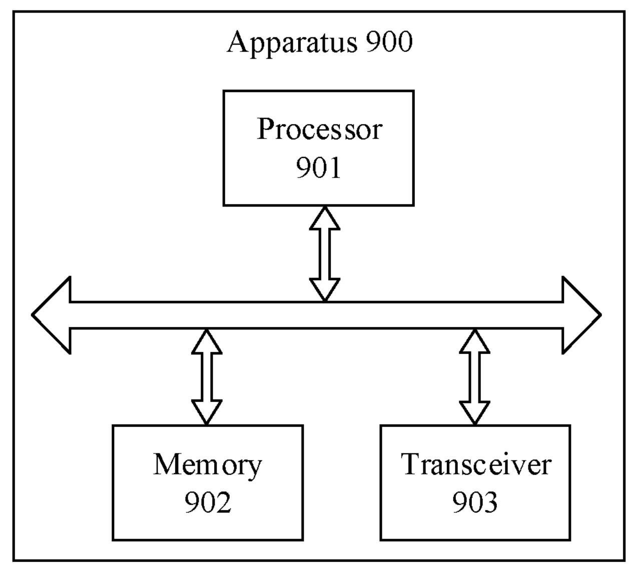
FIG. 10 is a schematic structural diagram of an apparatus for selecting a session management network element according to an embodiment of this application.

When the processing module 820 in this embodiment of this application is a processor, and the transceiver module 810 is a transceiver, the apparatus 800 in this embodiment of this application may be an apparatus 900 shown in FIG. 10.

FIG. 10 is a schematic structural diagram of the apparatus 900 for selecting a session management network element according to an embodiment of this application. As shown in FIG. 10, the apparatus 900 includes a processor 901.

In a possible implementation, the processor 901 is configured to invoke an interface to perform the following action: receiving a first message from a mobility management network element. The processor 901 is configured to: obtain first parameter information based on the first message, where the first message is used to request the service communication proxy network element to select an SMF based on the first parameter information; obtain a first request message based on the first message; and send the first request message to the SMF, where the first parameter information includes UE location information and a DNN. The processor 901 is further configured to: determine whether there is an SMF that satisfies the first parameter information; and when there is no SMF that satisfies the first parameter information, select one or more first SMFs that support the DNN and invoke a transceiver 903 to send a reject message to the mobility management network element, where the reject message includes information about the one or more first SMFs.

It should be understood that the processor 901 may invoke an interface to perform the foregoing sending and receiving actions. The invoked interface may be a logical interface or a physical interface. This is not limited. Optionally, the physical interface may be implemented by the transceiver 903. Optionally, the apparatus 900 further includes the transceiver 903.

Optionally, the apparatus 900 further includes a memory 902, and the memory 902 may store program code in the foregoing method embodiment, such that the processor 901 invokes the program code.

For example, if the apparatus 900 includes the processor 901, the memory 902, and the transceiver 903, the processor 901, the memory 902, and the transceiver 903 communicate with each other through an internal connection path, to transfer a control signal and/or a data signal. In a possible design, the processor 901, the memory 902, and the transceiver 903 may be implemented by a chip. The processor 901, the memory 902, and the transceiver 903 may be implemented on a same chip, or may be separately implemented on different chips, or any two functions of the processor 901, the memory 902, and the transceiver 903 are implemented on one chip. The memory 902 may store program code, and the processor 901 invokes the program code stored in the memory 902, to implement a corresponding function of the apparatus 900.

It should be understood that the apparatus 900 may be further configured to perform other steps and/or operations on the service communication proxy network element side in the foregoing embodiments. For brevity, details are not described herein again.

Figure 11:
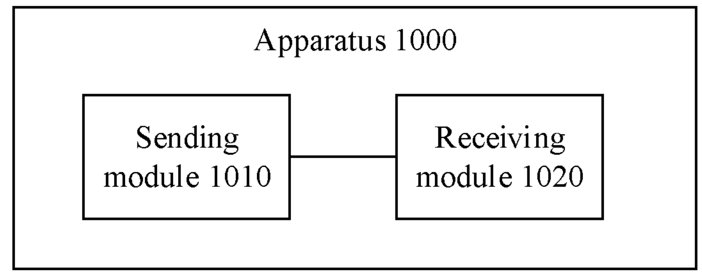
FIG. 11 is a possible example block diagram of another apparatus according to an embodiment of this application.

FIG. 11 is a possible example block diagram of another apparatus 1000 according to an embodiment of this application. The apparatus 1000 may exist in a form of software, or may be a mobility management network element, or may be a chip in a mobility management network element. The apparatus 1000 includes a sending module 1010 and a receiving module 1020. The sending module 1010 may include a receiving unit and a sending unit. The receiving module 1020 is configured to control and manage an action of the apparatus 1000. The sending module 1010 is configured to support communication between the apparatus 1000 and another network entity (for example, a session control function entity). Optionally, the apparatus 1000 may further include a storage unit, and the storage unit is configured to store program code and data of the apparatus 1000.

Optionally, the modules in the apparatus 1000 may be implemented by software.

Optionally, the receiving module 1020 may be a processor or a controller. For example, the receiving module 1020 may be a general-purpose CPU, a general-purpose processor, a DSP, an ASIC, an FPGA, another programmable logic device, a transistor logic device, a hardware component, or any combination thereof. The receiving module 1020 may implement or execute various example logical blocks, modules, and circuits described with reference to content disclosed in the embodiments of this application. The processor may be a combination of processors implementing a computing function, for example, a combination of one or more microprocessors, or a combination of a DSP and a microprocessor. The sending module 1010 may be a communications interface, a transceiver, a transceiver circuit, or the like. The communications interface is an umbrella term. In an implementation, the communications interface may include a plurality of interfaces. For example, the communications interface may include an interface between a mobility management network element and a CSCF network element and/or another interface. The storage unit may be a memory.

The receiving module 1020 can support the apparatus 1000 in performing actions of the mobility management network element in the foregoing method examples. For example, the receiving module 1020 can support the apparatus 1000 in performing step 240 in FIG. 2, steps 240 and 280 in FIG. 3, steps 340 and 360 in FIG. 4, steps 340, 360, and 392 in FIG. 5, step 430 in FIG. 6, and step 570 in FIG. 7.

The sending module 1010 can support communication between the apparatus 1000, a mobility management network element, and an SMF (for example, a V-SMF or an I-SMF). For example, the sending module 1010 can support the apparatus 1000 in performing step 210 in FIG. 2, steps 210 and 250 in FIG. 3, steps 310 and 350 in FIG. 4, steps 310, 350, and 370 in FIG. 5, steps 410 and 440 in FIG. 6, and step 510 in FIG. 7. For example, details may be provided as follows.

In a first implementation, the apparatus 1000 includes the sending module 1010 configured to: send a first message to a service communication proxy network element, where the first message includes first parameter information, and where the first message is used to request the service communication proxy network element to select an SMF based on the first parameter information; obtain a first request message based on the first request message; and send the first request message to the SMF, where the first parameter information includes UE location information and a DNN. The receiving module 1020 is configured to receive a reject message from the service communication proxy network element, where the reject message includes information about one or more first SMFs that support the DNN and that are selected by the service communication proxy network element.

In a possible implementation, the sending module 1010 is further configured to send a second message to the service communication proxy network element. The second message includes second parameter information and information about one or more third SMFs in the one or more first SMFs, where the second parameter information is used to discover a second SMF, where the second parameter information includes the UE location information, and where the information about the one or more third SMFs is sent to the second SMF.

In a possible implementation, the receiving module 1020 is further configured to receive information about the second SMF from the service communication proxy network element.

Optionally, the first parameter information further includes target network element type indication information, and the target network element type indication information is used to indicate the service communication proxy network element to select an SMF.

In a possible implementation, the sending module 1010 is further configured to: send first indication information to the service communication proxy network element, where the first indication information is used to indicate to the service communication proxy network element to select, when the service communication proxy network element determines that there is no SMF that satisfies the first parameter information, the one or more first SMFs that support the DNN, and send information about the one or more first SMFs to the mobility management network element.

Optionally, the second SMF is a V-SMF, and the one or more first SMFs are one or more H-SMFs. The first parameter information further includes an HPLMN ID. The first parameter information is used to discover an H-SMF. The reject message includes information about the one or more H-SMFs.

Optionally, the information about the one or more H-SMFs indicates one or more H-SMFs that support the HPLMN ID and the DNN and that are selected by the service communication proxy network element.

Optionally, the second SMF is an I-SMF.

It should be understood that the apparatus 1000 according to this embodiment of this application may correspond to the method performed by the mobility management network element in the foregoing method embodiment, for example, the method of FIG. 2 or FIG. 3. In addition, the foregoing and other management operations and/or functions of the modules in the apparatus 1000 are used to implement corresponding steps of the method performed by the mobility management network element in the foregoing method embodiment. Therefore, beneficial effects of the foregoing method embodiment can also be achieved. For brevity, details are not described herein again.

In a second implementation, the apparatus 1000 includes the sending module 1010 configured to: send a first message to a service communication proxy network element, where the first message includes first parameter information, and where the first message is used to request the service communication proxy network element to select an SMF based on the first parameter information; obtain a first request message based on the first request message; and send the first request message to the SMF, where the first parameter information includes UE location information and a DNN. The receiving module 1020 is configured to receive a reject message from the service communication proxy network element, where the reject message is used to indicate that there is no SMF that satisfies the first parameter information. The sending module 1010 is further configured to send second parameter information to the service communication proxy network element, where the second parameter information includes the DNN. The receiving module 1020 is further configured to receive a first response message from the service communication proxy network element, where the first response message includes information about one or more first SMFs.

In a possible implementation, the sending module 1010 is further configured to send a second message to the service communication proxy network element, where the second message includes third parameter information, where the third parameter information includes the UE location information, and where the third parameter information is used to select a second SMF.

In a possible implementation, the receiving module 1020 is further configured to receive information about the second SMF from the service communication proxy network element.

Optionally, the second parameter information further includes first indication information, and the first indication information is used to indicate to the service communication proxy network element to select one or more SMFs that support the DNN, and send the first response message to the mobility management network element.

Optionally, the second parameter information further includes first target network element type indication information, and the first target network element type indication information is used to indicate the service communication proxy network element to select an SMF.

Optionally, the second parameter information further includes second target network element type indication information, and the second target network element type indication information is used to indicate to the service communication proxy network element to select an intermediate SMF.

Optionally, the second SMF is an I-SMF.

It should be understood that the apparatus 1000 according to this embodiment of this application may correspond to the method performed by the mobility management network element in the foregoing method embodiment, for example, the method of FIG. 4 or FIG. 5. In addition, the foregoing and other management operations and/or functions of the modules in the apparatus 1000 are used to implement corresponding steps of the method performed by the mobility management network element in the foregoing method embodiment. Therefore, beneficial effects of the foregoing method embodiment can also be achieved. For brevity, details are not described herein again.

In a third implementation, the apparatus 1000 includes the sending module 1010 configured to send a first message to a service communication proxy network element, where the first message includes first parameter information, where the first message is used to request the service communication proxy network element to discover an H-SMF based on the first parameter information, and where the first parameter information includes an HPLMN ID and a DNN. The receiving module 1020 is configured to receive a first response message from the service communication proxy network element, where the first response message includes information about one or more H-SMFs.

In a possible implementation, the sending module 1010 is further configured to send a second message to the service communication proxy network element, where the second message includes second parameter information, where the second parameter information is used to discover a V-SMF, and where the second parameter information includes UE location information.

In a possible implementation, the receiving module 1020 is further configured to receive information about the V-SMF from the service communication proxy network element.

Optionally, the first parameter information further includes first indication information, and the first indication information is used to indicate the service communication proxy network element to return, after the service communication proxy network element discovers an H-SMF, a response message to the mobility management network element.

Optionally, the first parameter information further includes first target network element type indication information, and the first target network element type indication information is used to indicate to the service communication proxy network element to select an H-SMF or an SMF.

Optionally, the second parameter information further includes second target network element type indication information, and the second target network element type indication information is used to indicate to the service communication proxy network element to select a V-SMF.

It should be understood that the apparatus 1000 according to this embodiment of this application may correspond to the method performed by the mobility management network element in the foregoing method embodiment, for example, the method of FIG. 6. In addition, the foregoing and other management operations and/or functions of the modules in the apparatus 1000 are used to implement corresponding steps of the method performed by the mobility management network element in the foregoing method embodiment. Therefore, beneficial effects of the foregoing method embodiment can also be achieved. For brevity, details are not described herein again.

In a fourth implementation, the apparatus 1000 includes: the sending module 1010 configured to send a first message to a service communication proxy network element, where the first message includes first parameter information, and where the first parameter information includes UE location information and a DNN; and the receiving module 1020 configured to receive information about a fifth SMF and information about a second SMF from the service communication proxy network element, where the fifth SMF is an SMF in one or more fourth SMFs in a second request message.

In a possible implementation, that the receiving module 1020 is further configured to receive information about a fifth SMF and information about a second SMF from the service communication proxy network element includes: receiving a first response message from the service communication proxy network element, where the information about the fifth SMF and the information about the second SMF are included in a header or a message body of the first response message.

Optionally, the first SMF is an SMF, and the second SMF is an I-SMF. Alternatively, the first SMF is an H-SMF, and the second SMF is a V-SMF.

It should be understood that the apparatus 1000 according to this embodiment of this application may correspond to the method performed by the mobility management network element in the foregoing method embodiment, for example, the method of FIG. 7. In addition, the foregoing and other management operations and/or functions of the modules in the apparatus 1000 are used to implement corresponding steps of the method performed by the mobility management network element in the foregoing method embodiment. Therefore, beneficial effects of the foregoing method embodiment can also be achieved. For brevity, details are not described herein again.

In a fifth implementation, the apparatus 1000 includes: the sending module 1010 configured to send a first message to a service communication proxy network element, where the first message includes first parameter information, where the first message is used to request the service communication proxy network element to discover a session management network element based on the first parameter information, and where the first parameter information includes a DNN; and the receiving module 1020 configured to receive a first response message from the service communication proxy network element, where the first response message includes information about one or more session management network elements.

In a possible implementation, the sending module 1010 is further configured to send a second message to the service communication proxy network element, where the second message includes second parameter information, and where the second parameter information is used to discover an intermediate session management network element. The second parameter information includes UE location information.

In a possible implementation, the apparatus 1000 further includes a processing module (not shown in FIG. 10), and the processing module is configured to: before the second message is sent to the service communication proxy network element, determine, based on information about the session management network element, whether there is a session management network element that supports the UE location information; and if there is no session management network element that supports the UE location information, determine that an intermediate session management network element needs to be selected.

In a possible implementation, the receiving module 1020 is further configured to receive information about the intermediate session management network element from the service communication proxy network element.

In a possible implementation, the first parameter information further includes first indication information, and the first indication information is used to indicate to the service communication proxy network element to return, after the service communication proxy network element discovers a home session management network element or a session management network element, a response message to the mobility management network element.

In a possible implementation, the first parameter information further includes first target network element type indication information, and the first target network element type indication information is used to indicate a home session management network element or a session management network element, and is used to indicate to the service communication proxy network element to return, after the service communication proxy network element discovers the home session management network element or the session management network element, a response message to the mobility management network element.

In a possible implementation, the second parameter information further includes second target network element type indication information, and the second target network element type indication information is used to indicate to the service communication proxy network element to select a visited session management network element.

In a sixth implementation, the apparatus 1000 includes: the sending module 1010 configured to send a first message, where the first message includes first parameter information and second parameter information, where the first parameter information is used to select a first SMF, and where the second parameter information is used to select a second SMF; and the receiving module 1020 configured to receive information about a fifth SMF and information about a second SMF from the service communication proxy network element. The mobility management network element may obtain the two SMFs determined by the service communication proxy network element. In this way, when working in a delegated discovery mode, the mobility management network element still supports establishment of a session including two SMFs, such that an application scenario in which the mobility management network element works in the delegated discovery mode is not limited.

In a possible implementation, that the receiving module is configured to receive information about a fifth SMF and information about a second SMF from the service communication proxy network element includes: receiving a first response message from the service communication proxy network element, where the information about the fifth SMF and the information about the second SMF are included in a header or a message body of the first response message.

Optionally, the first SMF is an SMF, and the second SMF is an I-SMF. Alternatively, the first SMF is an H-SMF, and the second SMF is a V-SMF.

It should be understood that the apparatus 1000 according to this embodiment of this application may correspond to the method performed by the mobility management network element in the foregoing method embodiment, for example, the method of FIG. 8. In addition, the foregoing and other management operations and/or functions of the modules in the apparatus 1000 are used to implement corresponding steps of the method performed by the mobility management network element in the foregoing method embodiment. Therefore, beneficial effects of the foregoing method embodiment can also be achieved. For brevity, details are not described herein again.

Figure 12:
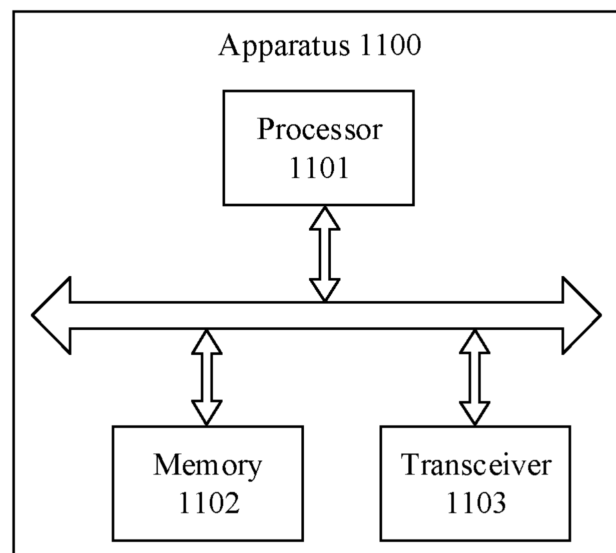
FIG. 12 is a schematic structural diagram of another apparatus for selecting a session management network element according to an embodiment of this application.

When the receiving module 1020 and the sending module 1010 in this embodiment of this application are integrated as a transceiver, the apparatus 1000 in this embodiment of this application may be an apparatus 1100 shown in FIG. 12.

FIG. 12 is a schematic structural diagram of the apparatus 1100 for selecting a session management network element according to an embodiment of this application. As shown in FIG. 12, the apparatus 1100 includes a processor 1101.

In a possible implementation, the processor 1101 is configured to invoke an interface to perform the following actions: sending a first message to a service communication proxy network element, where the first message includes first parameter information, and where the first message is used to request the service communication proxy network element to select an SMF based on the first parameter information; obtaining a first request message based on the first request message; sending the first request message to the SMF, where the first parameter information includes UE location information and a DNN; and receiving a reject message from the service communication proxy network element, where the reject message includes information about one or more first SMFs that support the DNN and that are selected by the service communication proxy.

It should be understood that the processor 1101 may invoke an interface to perform the foregoing sending and receiving actions. The invoked interface may be a logical interface or a physical interface. This is not limited. Optionally, the physical interface may be implemented by a transceiver. Optionally, the apparatus 1100 further includes the transceiver 1103.

Optionally, the apparatus 1100 further includes a memory 1102, and the memory 1102 may store program code in the foregoing method embodiment, such that the processor 1101 invokes the program code.

For example, if the apparatus 1100 includes the processor 1101, the memory 1102, and the transceiver 1103, the processor 1101, the memory 1102, and the transceiver 1103 communicate with each other through an internal connection path, to transfer a control signal and/or a data signal. In a possible design, the processor 1101, the memory 1102, and the transceiver 1103 may be implemented by a chip. The processor 1101, the memory 1102, and the transceiver 1103 may be implemented on a same chip, or may be separately implemented on different chips, or any two functions of the processor 1101, the memory 1102, and the transceiver 1103 are implemented on one chip. The memory 1102 may store program code, and the processor 1101 invokes the program code stored in the memory 1102, to implement a corresponding function of the apparatus 1100.

It should be understood that the apparatus 1100 may be further configured to perform other steps and/or operations on the mobility management network element side in the foregoing embodiment. For brevity, details are not described herein again.

The method disclosed in the embodiments of this application may be applied to a processor or may be implemented by a processor. The processor may be an integrated circuit chip and has a signal processing capability. In an implementation process, the steps in the foregoing method embodiments may be completed by a hardware integrated logical circuit in the processor or an instruction in a form of software. The processor may be a general-purpose processor, a DSP, an ASIC, an FPGA, another programmable logic device, a discrete gate, a transistor logic device, a discrete hardware component, a system on chip (SoC), a CPU, a network processor (NP), a DSP, a micro controller unit (MCU), a programmable controller (e.g., a programmable logic device (PLD)), or another integrated chip. The processor can implement or perform the methods, the steps, and logical block diagrams that are disclosed in the embodiments of this application. The general-purpose processor may be a microprocessor, or may be any conventional processor or the like. Steps of the methods disclosed with reference to the embodiments of this application may be directly executed and accomplished by a hardware decoding processor, or may be executed and accomplished by a combination of hardware and software modules in a decoding processor. A software module may be located in a mature storage medium in the art, such as a random-access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), and is used as an external cache. Through example description but not limitative description, many forms of RAMs may be used, for example, a static random access memory (SRAM), a dynamic random access memory (DRAM), a synchronous dynamic random access memory (SDRAM), a double data rate (DDR) SDRAM, an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

It should be understood that in the embodiments of this application, numbers "first", "second", and the like are merely used to distinguish between different objects, for example, to distinguish between different parameter information or messages, and do not constitute any limitation on the scope of the embodiments of this application. The embodiments of this application are not limited thereto.

It should be further understood that sequence numbers of the foregoing processes do not mean execution sequences in various embodiments of this application, and the execution sequences of the processes should be determined depending on functions and internal logic of the processes. Numbers or sequence numbers in the foregoing processes are merely used for differentiation for ease of description, and should not constitute any limitation on implementation processes of the embodiments of this application.

It should be further understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression used in this application similar to an expression that "an item includes at least one of the following: A, B, or C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional case of the item. When the expression is "the item includes at least one of the following: A, B, . . . , or X", that is, more elements are included in the expression, cases to which the item is applicable may also be obtained according to the foregoing rule.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or partially contribute to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

receiving, by a service communication proxy network element, a first message from a mobility management network element;

obtaining, by the service communication proxy network element, first parameter information based on the first message, wherein the first parameter information comprises user equipment (UE) location information and a data network name (DNN);

determining, by the service communication proxy network element, whether any session management network elements satisfy the first parameter information; and sending, by the service communication proxy network element when there is no session management network element that satisfies the first parameter information, a reject message to the mobility management network element, wherein the reject message indicates that no session management network element satisfies the first parameter information.

2. The method according to claim 1, further comprising:

obtaining, by the service communication proxy network element when determining that a session management network element satisfies the first parameter information, a first request message based on the first message; and sending the first request message to the session management network element.

3. The method according to claim 1, further comprising:

receiving, by the service communication proxy network element, second parameter information from the mobility management network element, wherein the second parameter information comprises the DNN;

selecting, by the service communication proxy network element, one or more first session management network elements that support the second parameter information; and sending a first response message to the mobility management network element, wherein the first response message comprises information about the one or more first session management network elements.

4. The method according to claim 3, wherein the information about the one or more first session management network elements comprises at least one of service area information of the one or more first session management network elements, identification information of the one or more first session management network elements, or a uniform resource identifier (URI) of the one or more first session management network elements.

5. The method according to claim 3, wherein the second parameter information further comprises first indication information, and wherein the first indication information instructs the service communication proxy network element to select the one or more first session management network elements that support the DNN and to send the first response message to the mobility management network element.

6. The method according to claim 3, further comprising sending, by the mobility management network element, a second message to the service communication proxy network element, wherein the second message comprises third parameter information, wherein the third parameter information comprises the UE location information, and wherein the third parameter information is for selecting a second session management network element.

7. The method according to claim 1, further comprising:

receiving, by the service communication proxy network element after sending the reject message to the mobility management network element, a second message from the mobility management network element;

obtaining, by the service communication proxy network element, third parameter information based on the second message, wherein the third parameter information comprises the UE location information;

selecting, by the service communication proxy network element, a second session management network element based on the third parameter information;

obtaining, by the service communication proxy network element, a second request message based on the second message; and sending the second request message to the second session management network element.

8. The method according to claim 7, further comprising sending, by the service communication proxy network element, information about the second session management network element to the mobility management network element.

9. The method according to claim 8, wherein sending the information about the second session management network element to the mobility management network element comprises:

receiving, by the service communication proxy network element, a response message from the second session management network element;

adding the information about the second session management network element to the response message; and sending, to the mobility management network element, the information that is about the second session management network element and that is p the response message.

10. The method according to claim 6, wherein the information about the second session management network element comprises one or more of service area information of a server, identification information, or a uniform resource identifier (URI) that are of the second session management network element.

11. The method according to claim 7, further comprising:

receiving, by the service communication proxy network element, a response message from the second session management network element, wherein the response message carries information about the second session management network element; and sending the response message to the mobility management network element.

12. The method according to claim 1, wherein before receiving the first message, the method further comprises sending, by the mobility management network element, the first message to the service communication proxy network element, wherein the first message comprises the first parameter information, wherein the first message requests the service communication proxy network element to select a session management network element based on the first parameter information, and wherein the first parameter information comprises the UE location information and the DNN.

13. The method according to claim 1, further comprising receiving, by the mobility management network element, the reject message from the service communication proxy network element.

14. An apparatus, comprising:

a memory configured to store instructions; and one or more processors coupled to the memory and configured to execute the instructions to cause the apparatus to:

receive a first message from a mobility management network element;

obtain first parameter information based on the first message, wherein the first parameter information comprises user equipment (UE) location information and a data network name (DNN);

determine whether any session management network elements satisfy the first parameter information; and send a reject message to the mobility management network element when there is no session management network element that satisfies the first parameter information, wherein the reject message indicates that no session management network element satisfies the first parameter information.

15. The apparatus according to claim 14, wherein when there is a session management network element that satisfies the first parameter information, the one or more processors are further configured to execute the instructions to cause the apparatus to:

obtain a first request message based on the first message; and send the first request message to the session management network element.

16. The apparatus according to claim 14, wherein the one or more processors are further configured to execute the instructions to cause the apparatus to:

receive second parameter information from the mobility management network element, wherein the second parameter information comprises the DNN;

select one or more first session management network elements that support the second parameter information; and send a first response message to the mobility management network element, wherein the first response message comprises information about the one or more first session management network elements.

17. The apparatus according to claim 16, wherein the one or more processors are further configured to execute the instructions to cause the apparatus to select the one or more first session management network elements and send the first response message when the second parameter information further comprises first indication information instructing the apparatus to select the one or more first session management network elements that support the DNN and to send the first response message to the mobility management network element.

18. The apparatus according to claim 13, wherein the second parameter information further comprises first target network element type indication information indicating a session management network element and instructing the apparatus to select the one or more first session management network elements that support the DNN and to send the first response message to the mobility management network element.

19. The apparatus according to claim 14, wherein after sending the reject message to the mobility management network element, the transceiver is further configured to receive a second message from the mobility management network element, and wherein the processor is further configured to:

obtain third parameter information based on the second message, wherein the third parameter information comprises the UE location information;

select a second session management network element based on the third parameter information;

obtain a second request message based on the second message; and invoke the transceiver to send the second request message to the second session management network element.

20. The apparatus according to claim 19, wherein the transceiver is further configured to send information about the second session management network element to the mobility management network element.

21. The apparatus according to claim 20, wherein after invoking the transceiver to receive a response message from the second session management network element, the processor is further configured to:

add the information about the second session management network element to the response message; and send, to the mobility management network element through the transceiver, the information that is about the second session management network element and that is in the response message.

22. The apparatus according to claim 15, wherein the information about the second session management network element comprises one or more of service area information of a server, identification information, or a uniform resource identifier (URI) that are of the second session management network element.

23. The apparatus according to claim 19, wherein the one or more processors are further configured to execute the instructions to cause the apparatus to:

receive a response message from the second session management network element, wherein the response message carries information about the second session management network element; and send the response message to the mobility management network element.

24. A method comprising:

sending, by a mobility management network element, a first message to a service communication proxy network element, wherein the first message comprises first parameter information, wherein the first message requests the service communication proxy network element to select a session management network element based on the first parameter information, and wherein the first parameter information comprises user equipment (UE) location information and a data network name (DNN); and receiving, by the mobility management network element, a reject message from the service communication proxy network element, wherein the reject message indicates that no session management network element satisfies the first parameter information.

25. The method according to claim 24, further comprising:

sending, by the mobility management network element, second parameter information comprising the DNN; and receiving, by the mobility management network element, a first response message comprising information about one or more first session management network elements.

26. The method according to claim 24, further comprising sending, by the mobility management network element, a second message to the service communication proxy network element, wherein the second message comprises third parameter information, wherein the third parameter information comprises the UE location information, and wherein the third parameter information is for selecting a second session management network element.

27. The method according to claim 26, further comprising receiving, by the mobility management network element, information about the second session management network element from the service communication proxy network element.

28. The method according to claim 27, wherein receiving, by the mobility management network element, the information about the second session management network element from the service communication proxy network element comprises receiving, by the mobility management network element, a response message from the service communication proxy network element, wherein the response message carries the information about the second session management network element.

29. An apparatus comprising:

a memory configured to store instructions; and one or more processors coupled to the memory and configured to execute the instructions to cause the apparatus to:

send a first message to a service communication proxy network element, wherein the first message comprises first parameter information, wherein the first message requests the service communication proxy network element to select a session management network element based on the first parameter information, and wherein the first parameter information comprises user equipment (UE) location information and a data network name (DNN); and receive a reject message from the service communication proxy network element, wherein the reject message indicates that no session management network element satisfies the first parameter information.

30. A communications system comprising:

a service communication proxy network element; and a mobility management network element configured to:

send a first message to the service communication proxy network element, wherein the first message comprises first parameter information, wherein the first message requests the service communication proxy network element to select a session management network element based on the first parameter information, and wherein the first parameter information comprises user equipment (UE) location information and a data network name (DNN); and receive a reject message from the service communication proxy network element, wherein the reject message indicates that no session management network element satisfies the first parameter information, wherein the service communication proxy network element is configured to:

receive the first message from the mobility management network element;

obtain the first parameter information based on the first message;

determine whether any session management network elements satisfy the first parameter information; and send the reject message to the mobility management network element when there is no session management network element that satisfies the first parameter information.

* * * * *

UNITED STATES PATENT AND TRADEMARK OFFICE

CERTIFICATE OF CORRECTION

PATENT NO. : 12,028,929 B2
APPLICATION NO. : 17/491849
DATED : July 2, 2024
INVENTOR(S) : Zaifeng Zong and Fenqin Zhu It is certified that error appears in the above-identified patent and that said Letters Patent is hereby corrected as shown below:

In the Claims

Claim 9, Column 61, Line 26: “is p the response” should read “is in the response”

Claim 10, Column 61, Line 28: “claim 6,” should read “claim 8,”

Claim 18, Column 62, Line 43: “claim 13,” should read “claim 16,”

Claim 19, Column 62, Lines 51-53: “wherein after sending the reject message to the mobility management network element, the transceiver is further configured to” should read “wherein the one or more processors are further configured to execute the instructions to cause the apparatus to:”

Claim 19, Column 62, Line 54: “receive a second” should read “receive, after sending the reject message to the mobility management network element, a second”

Claim 19, Column 62, Lines 55-56: “element, and wherein the processor is further configured to:” should read “element;”

Claim 19, Column 62, Line 64: “invoke the transceiver to send” should read “to send”

Claim 20, Column 62, Line 67: “transceiver is further configured” should read “one or more processors are further configured”

Claim 20, Column 62, Line 67: “configured to send” should read “configured to execute the instructions to cause the apparatus to send”

Claim 21, Column 63, Lines 3-4: “wherein after invoking the transceiver to receive” should read “wherein the one or more processors are further configured to execute the instructions to cause the apparatus to: receive”

Signed and Sealed this
Sixth Day of August, 2024

Katherine Kelly Vidal

Katherine Kelly Vidal
*Director of the United States Patent and Trademark Office*

Claim 21, Column 63, Lines 5-6: "element, the processors is further configured to:" should read "element;"

Claim 21, Column 63, Lines 9-10: "element through the transceiver, the information" should read "element, the information"

Claim 22, Column 63, Line 13: "claim 15" should read "claim 20"